US012309649B2

(12) United States Patent
Liu et al.

(10) Patent No.: US 12,309,649 B2
(45) Date of Patent: May 20, 2025

(54) USER EQUIPMENT (UE) MOBILITY HISTORY INFORMATION MANAGEMENT

(71) Applicant: QUALCOMM Incorporated, San Diego, CA (US)

(72) Inventors: Huichun Liu, Beijing (CN); Gavin Bernard Horn, La Jolla, CA (US); Luis Fernando Brisson Lopes, Swindon (GB); Xipeng Zhu, San Diego, CA (US); Peng Cheng, Beijing (CN); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/634,746

(22) PCT Filed: Aug. 15, 2019

(86) PCT No.: PCT/CN2019/100700
§ 371 (c)(1),
(2) Date: Feb. 11, 2022

(87) PCT Pub. No.: WO2021/026852
PCT Pub. Date: Feb. 18, 2021

(65) Prior Publication Data
US 2022/0279399 A1 Sep. 1, 2022

(51) Int. Cl.
*H04W 36/00* (2009.01)
*H04W 36/14* (2009.01)
(Continued)

(52) U.S. Cl.
CPC .............. *H04W 36/008375* (2023.05); *H04W 36/0069* (2018.08); *H04W 36/00692* (2023.05);
(Continued)

(58) Field of Classification Search
CPC .............. H04W 36/0083–008375; H04W 36/0055–00698
See application file for complete search history.

(56) References Cited

U.S. PATENT DOCUMENTS

| 8,761,805 | B2 * | 6/2014 | Miklos | ................. | H04W 60/04 |
| | | | | | 455/433 |
| 10,212,637 | B2 | 2/2019 | Jung et al. | | |

(Continued)

FOREIGN PATENT DOCUMENTS

| CN | 104272777 A | 1/2015 |
| CN | 104602218 A | 5/2015 |

(Continued)

OTHER PUBLICATIONS

Nokia, et al., "Mobility History Information in NR", 3GPP TSG RAN WG2 Meeting #106, R2-1906663 (R2-1904369), Reno, USA, May 13, 2019-May 17, 2019, 2 Pages, May 17, 2019.

(Continued)

*Primary Examiner* — Brendan Y Higa
(74) *Attorney, Agent, or Firm* — Dinsmore & Shohl LLP—Qualcomm

(57) ABSTRACT

This disclosure provides systems, methods, apparatus, and computer programs encoded on a computer storage media for providing user equipment mobility history information to a remote computing platform. In one aspect, a user equipment may store user equipment mobility history information in memory within the user equipment. The user equipment may determine whether a radio access network connection state has changed from a primary cell in a radio resource controller state to another cell outside a radio access network, to an inter-radio access technology cell, or to an out of service. The user equipment may transmit the user equipment mobility history information to the remote computing platform in response to determining that the user (Continued)

equipment radio access network connection state has changed from a primary cell in a radio resource controller state to another cell outside a radio access network, an inter-radio access technology cell, or an out of service state.

30 Claims, 19 Drawing Sheets

(51) Int. Cl.
  *H04W 76/15* (2018.01)
  *H04W 76/27* (2018.01)
(52) U.S. Cl.
  CPC ....... *H04W 36/0083* (2013.01); *H04W 36/14* (2013.01); *H04W 76/15* (2018.02); *H04W 76/27* (2018.02)

(56) References Cited

U.S. PATENT DOCUMENTS

| | | | |
|---|---|---|---|
| 10,212,750 | B2 | 2/2019 | Godin et al. |
| 10,356,683 | B2* | 7/2019 | Kim ................ H04W 8/08 |
| 10,694,371 | B2* | 6/2020 | Lim ................ H04W 36/165 |
| 12,219,414 | B2* | 2/2025 | Arshad ......... H04W 36/008375 |
| 2010/0272050 | A1* | 10/2010 | Lim ................ H04W 36/0055 370/329 |
| 2012/0039305 | A1* | 2/2012 | Han ................ H04W 36/245 370/332 |
| 2013/0165120 | A1* | 6/2013 | Nylander ............ H04W 8/08 455/436 |
| 2014/0254550 | A1* | 9/2014 | Salvador ....... H04W 36/008375 370/331 |
| 2015/0111581 | A1* | 4/2015 | Yiu .................. H04W 8/08 455/437 |
| 2015/0189492 | A1* | 7/2015 | Koskinen ............. H04W 8/08 370/328 |
| 2016/0165492 | A1* | 6/2016 | Lei ................. H04W 36/0061 455/438 |
| 2019/0274074 | A1* | 9/2019 | Lee ................. H04W 76/27 |
| 2019/0373442 | A1* | 12/2019 | Kim ................ H04W 24/10 |
| 2020/0137673 | A1* | 4/2020 | Shikari ............ H04W 16/14 |
| 2021/0105605 | A1 | 4/2021 | Tsuboi et al. |
| 2021/0385711 | A1* | 12/2021 | Tamura ............ H04W 92/24 |

FOREIGN PATENT DOCUMENTS

| | | |
|---|---|---|
| EP | 2882207 A1 | 6/2015 |
| JP | 2016187224 A | 10/2016 |
| JP | 2018082493 A | 5/2018 |
| KR | 20150040903 A | 4/2015 |
| WO | 2016070932 A1 | 5/2016 |
| WO | 2018155918 A1 | 8/2018 |
| WO | 2019126917 | 7/2019 |

OTHER PUBLICATIONS

Supplementary European Search Report—EP19941146—Search Authority—Munich—Feb. 14, 2023, 11 pages.
Alcatel-Lucent., "Mobility Information", 3GPP TSG-RAN WG2#86, R2-142428, May 23, 2014 (May 23, 2014), 2 pages, sections 1-3.
International Search Report and Written Opinion—PCT/CN2019/100700—ISA/EPO—May 14, 2020.

* cited by examiner

USER EQUIPMENT (UE) MOBILITY HISTORY INFORMATION MANAGEMENT

TECHNICAL FIELD

This disclosure relates generally to wireless devices, and more particularly to managing wireless devices to provide user equipment mobility history information.

DESCRIPTION OF RELATED TECHNOLOGY

Long Term Evolution (LTE), 5G new radio (NR), and other recently developed communication technologies allow wireless devices to communicate information at data rates (such as in terms of Gigabits per second, etc.) that are orders of magnitude greater than what was available just a few years ago. LTE supports the collection and sharing, by the network, of connected-mode mobility history information to avoid delays during handover. Typically, a source remote computing platform, such as a base station (such as a logical 5G radio node (gNB) or evolved Node B (eNB)), collects and stores user equipment (UE) mobility history information, as long as the UE remains within one of its cells. Mobility history information generally includes a listing of visited cells (i.e., vistedCellList) or an indication of the time spent within a cell (i.e., timeSpent). The collected and stored UE mobility history information is generally then used in subsequent handover preparations, such as through handover preparation procedures over interfaces (such as S1 or X2), such as between the LTE radio access network (RAN) and the evolved packet core transport network layer or between two eNB's. Providing a target eNB with a list of previously visited cells and associated information elements (such as per-cell information) may enhance handover times.

While RAN's typically collect connected mode mobility history information on the network side (i.e., at a computing platform remote from the UE), such information is released when the UE enters an idle state (such as RRC_IDLE). Since collected mobility history information is not shared with other nodes under certain conditions, the other nodes cannot perform mobility related optimization based on UE mobility history. For example, a listing of visited cells in the mobility history information will not include UE radio resource controller (RRC) state information, meaning the RAN/Core Network (CN) cannot perform RRC state specific mobility optimization.

SUMMARY

The systems, methods and devices of this disclosure each have several innovative aspects, no single one of which is solely responsible for the desirable attributes disclosed herein.

One innovative aspect of the subject matter described in this disclosure may be implemented in a wireless mobile communication device (hereinafter referred to as "user equipment" or "UE"). Some implementations may include methods performed by a processor of the UE for providing UE mobility history information to a remote computing platform.

In some implementations, the method may be performed by a processor of a UE for providing UE mobility history information to a remote computing platform. Some implementations may include storing UE mobility history information in memory within the UE. Some implementations may include determining whether a RAN connection state of the UE has changed from a primary cell in a radio resource controller state to another cell outside a RAN, to an inter-radio access technology cell, or to an out of service state. Some implementations may include transmitting the UE mobility history information to the remote computing platform in response to determining that the RAN connection state of the UE has changed from a primary cell in a radio resource controller state to another cell outside a RAN, to an inter-radio access technology cell, or to an out of service state.

In some implementations, the method may include setting the time spent for each radio resource controller state with a previous primary cell or a previous secondary cell in a variable entry of the UE mobility history information in response to determining the RAN connection state of the UE has changed from a primary cell in a radio resource controller state to another cell outside a RAN, to an inter-radio access technology cell, or to an out of service state.

In some implementations, the method may include setting the radio resource controller state for each radio resource controller state of a previous primary cell or a previous secondary cell in the variable entry of the UE mobility history information in response to determining the RAN connection state of the UE has changed from a primary cell in a radio resource controller state to another cell outside a RAN, to an inter-radio access technology cell, or to an out of service state.

In some implementations, the method may include determining whether the global cell identity of a previous primary cell or a previous secondary cell is available. In some implementations, the method may include the global cell identity in a variable entry of the UE mobility history information in response to determining that the global cell identity of the previous primary cell or the previous secondary cell is available. In some implementations, the method may include the physical cell identity (PCI) and frequency in a variable entry of the UE mobility history information in response to determining that the global cell identity of the previous primary cell or the previous secondary cell is not available.

In some implementations, the method may include determining whether a dual/multi-connectivity status is required. In some implementations, the method may include a global cell identity of a previous primary cell or a previous secondary cell in a variable entry of the UE mobility history information in response to determining the dual/multi-connectivity status is required.

In some implementations, the method may include determining whether a radio access technology type indication is required. In some implementations, the method may include an indication of the radio access technology in a variable entry of the UE mobility history information in response to determining the radio access technology type indication is required.

In some implementations, the method may include determining whether the global cell identity of the previous cell or secondary cell is available. In addition, the method may include determining whether a dual/multi-connectivity status is required. In some implementations, the method may a physical cell identity and carrier frequency of the previous or secondary cell in a variable entry of the UE mobility history information in response to determining neither the global cell identity of the previous cell or secondary cell is available nor the dual/multi-connectivity status is required.

In some implementations, the method may include determining whether the UE has entered a new radio or next generation RAN while previously out of service or using another radio access technology. In some implementations, the method may include the global cell identity in a variable entry of the UE mobility history information in response to determining the UE has entered a new radio or next generation RAN while previously out of service or using another radio access technology.

In some implementations, the method may include setting the radio resource controller state information in the variable entry to outside new radio or outside next generation RAN in response to determining the UE has entered a new radio or next generation RAN while previously out of service or using another radio access technology.

In some implementations, the method may include setting the time spent field information in the variable entry to the time spent outside the new radio or the next generation RAN in response to determining the UE has entered a new radio or next generation RAN while previously out of service or using another radio access technology.

In some implementations, the method may include receiving from the remote computing platform a UE information request. In some implementations of the method may transmit a UE information response indicating the UE mobility history information is available to the remote computing platform.

In some implementations, the mobility history information may include at least one data set selected from a listing of visited cells, an indication of how long the UE shall store the mobility history information, a cell list, a remote network access list, a timing advance list, a radio access technology type, connectivity state information, and radio resource controller state information.

In some implementations, the method may be performed by a processor of a first remote RAN computing platform for providing UE mobility history information to a second remote RAN computing platform. Some implementations may include receiving UE mobility history information from UE. Some implementations may store the UE mobility history information in memory of the first remote RAN computing platform. Some implementations may transmit the UE mobility history information received from the UE to the second remote RAN computing platform.

In some implementations, the UE mobility history information may be part of at least one of a handover preparation procedure, a context retrieval procedure, a UE suspend procedure, and a UE context release complete procedure.

In some implementations, the method may include receiving UE mobility history information from a third remote RAN computing platform. In some implementations, the method may include comparing the UE mobility history information received from the third RAN computing platform to the UE mobility history information received from the UE. In some implementations, the method may include storing the UE mobility history information received from the third RAN computing platform that does not conflict with the UE mobility history information received from the UE in the memory of the first remote RAN computing platform.

Further aspects may include a wireless device having a processor configured with processor-executable instructions to perform operations of any of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
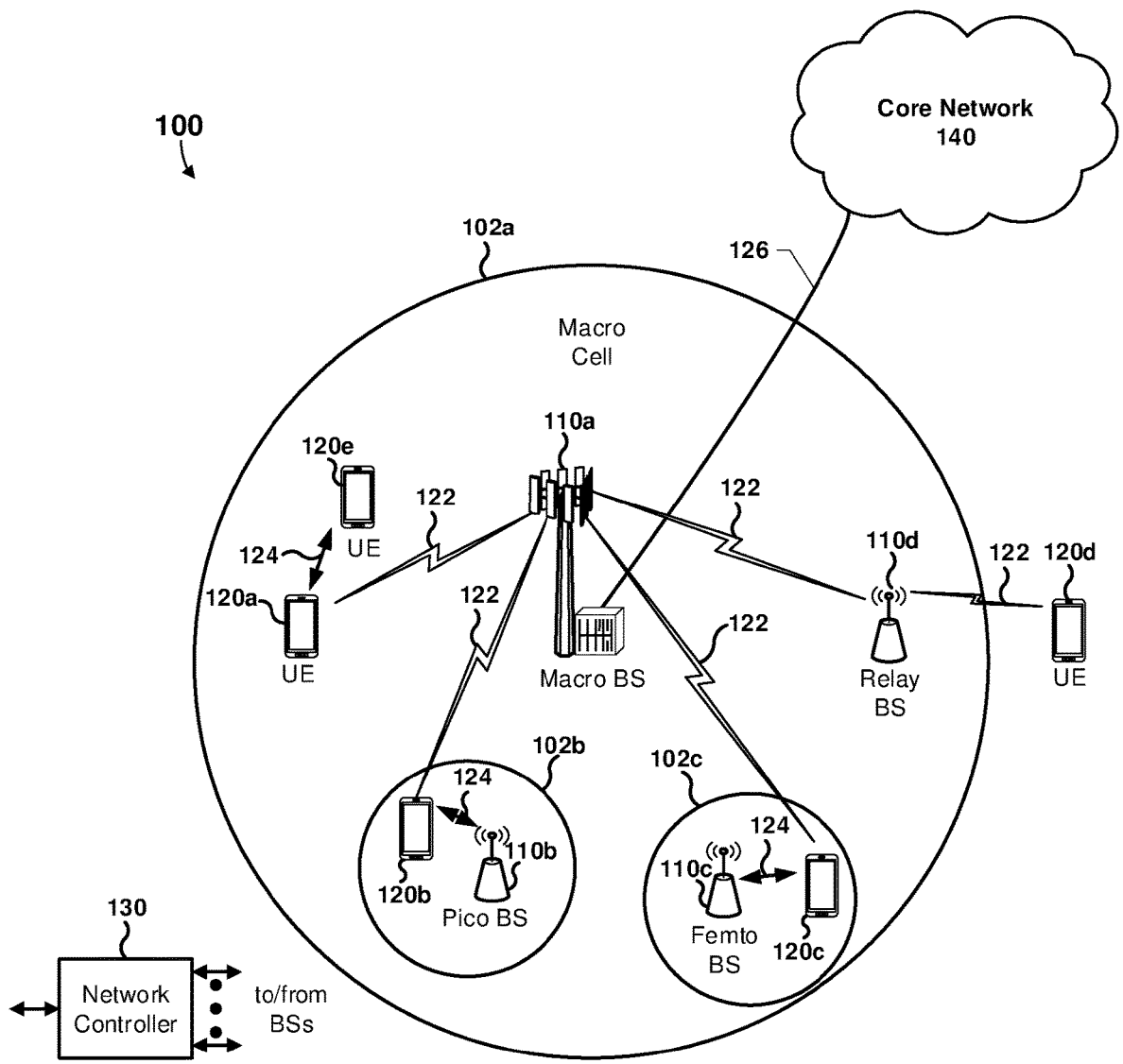
FIG. 1 shows a system block diagram illustrating an example communications system.

The following description is directed to certain implementations for the purposes of describing the innovative aspects of this disclosure. However, a person having ordinary skill in the art will readily recognize that the teachings herein may be applied in a multitude of different ways.

The described implementations may be implemented in any device, system, or network that is capable of transmitting and receiving radio frequency (RF) signals according to any of the Institute of Electrical and Electronics Engineers (IEEE) 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other signals that are used to communicate within a wireless, cellular or Internet of Things (IoT) network, such as a system utilizing 3G, 4G, or 5G technology, or further implementations thereof.

The described implementations may be implemented in any device, system, or network that is capable of providing UE mobility history information from a UE to a remote computing platform. Implementations may store UE mobility history information in memory within the UE; determine whether a RAN connection state of the UE has changed from a primary cell in a radio resource controller state (such as RRC_CONNECT, RRC_IDLE, RRC_INACTIVE) to another cell outside a RAN, to an inter-radio access technology cell, or to an out of service state; and transmit the UE mobility history information to the remote computing platform in response to determining that the RAN connection state of the UE has changed from a primary cell in a radio resource controller state to another cell outside a RAN, to an inter-radio access technology cell, or to an out of service state.

In some implementations, UE may store and report mobility history information containing each RRC state/cell combination with the time spent within a cell (i.e., timeSpent), RAT type indication and each cell ID/RAT type cases of dual-connectivity/Multi-connectivity. The mobility history information may be stored by the UE for retrieval by the RAN, which may in-turn share that mobility history information with another RAN node or AMF over Xn/N2. The RAN may combine the UE mobility history information retrieved from UE with similar information retrieved from another RAN node of that UE. For example, mobility history information exchanged between nodes during a UE context retrieval procedure for RRC_INACTIVE UE, may be optimized by a RAN with a UE specific RAN configuration based on the UE mobility history in an RRC_INACTIVE state. In addition, RAN paging or core network (CN) paging may be optimized based on the exchanged UE mobility history information (such as information on recommended cells and gNBs for paging).

LTE supports UE's storing mobility history information covering RRC_CONNECTED and RRC_IDLE. The UE may indicate "mobilityHistoryAvail" in an "RRCConnectionResumeComplete/RRCConnectionsetupComplete" term. Thereafter, the network may retrieve the mobility history information via a UE Information Request and a corresponding UE Information Response. In NR Work Item Description (WID) on self-organizing networks (SON) minimizing of drive tests (MDT), NR may support a similar mobility history information collection scheme by UE for RRC_IDLE, RRC_INACTIVE and RRC_CONNECTED, taking LTE mobility history information as a baseline.

Particular implementations of the subject matter described in this disclosure can be implemented to realize one or more of the following potential advantages. Some implementations may improve the operations of a UE and a communication network by reducing an amount of time needed for procedures such as handover preparation, context retrieval, UE suspend, or UE context release when a UE leaves one network (such as an LTE network) and connects to another network (such as an NR RAN or Next Generation (NG)-RAN). Some implementations may improve the operations of a UE and a communication network by reducing an amount of time needed for such procedures by providing mobility history information to the new network without the need for such networks to exchange such information directly.

The term "wireless device" is used herein to refer to any one or all of wireless router devices, wireless appliances, cellular telephones, smartphones, portable computing devices, personal or mobile multi-media players, laptop computers, tablet computers, smartbooks, ultrabooks, palmtop computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (for example, smart rings and smart bracelets), entertainment devices (for example, wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, wireless devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources or processors integrated on a single substrate. A single SOC may contain circuitry for digital, analog, mixed-signal, and radio-frequency functions. A single SOC also may include any number of general purpose or specialized processors (digital signal processors, modem processors, video processors, etc.), memory blocks (such as ROM, RAM, Flash, etc.), and resources (such as timers, voltage regulators, oscillators, etc.). SOCs also may include software for controlling the integrated resources and processors, as well as for controlling peripheral devices.

The term "system in a package" (SIP) may be used herein to refer to a single module or package that contains multiple resources, computational units, cores or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP also may include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (such as a CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

FIG. 1 shows a system block diagram illustrating an example communications system The communications system 100 may be an 5G NR network, or any other suitable network such as an LTE network.

The communications system 100 may include a heterogeneous network architecture that includes a core network 140 and a variety of mobile devices (illustrated as wireless device 120a-120e in FIG. 1). The communications system 100 also may include a number of base stations (illustrated as the BS 110a, the BS 110b, the BS 110c, and the BS 110d) and other network entities. A base station is an entity that communicates with wireless devices (mobile devices), and also may be referred to as an Computing platformB, a Computing platform B, an LTE evolved computing platformB (eNB), an access point (AP), a radio head, a transmit receive point (TRP), a New Radio base station (NR BS), a 5G Computing platformB (NB), a Next Generation Computing platformB (gNB), or the like. Each base station may provide communication coverage for a particular geographic area. In 3GPP, the term "cell" can refer to a coverage area of a base station, a base station subsystem serving this coverage area, or a combination thereof, depending on the context in which the term is used.

A base station 110a-110d may provide communication coverage for a macro cell, a pico cell, a femto cell, another type of cell, or a combination thereof. A macro cell may cover a relatively large geographic area (for example, several kilometers in radius) and may allow unrestricted access by mobile devices with service subscription. A pico cell may cover a relatively small geographic area and may allow unrestricted access by mobile devices with service subscription. A femto cell may cover a relatively small geographic area (for example, a home) and may allow restricted access by mobile devices having association with the femto cell (for example, mobile devices in a closed subscriber group (CSG)). A base station for a macro cell may be referred to as a macro BS. A base station for a pico cell may be referred to as a pico BS. A base station for a femto cell may be referred to as a femto BS or a home BS. In the example illustrated in FIG. 1, a base station 110a may be a macro BS for a macro cell 102a, a base station 110b may be a pico BS for a pico cell 102b, and a base station 110c may be a femto BS for a femto cell 102c. A base station 110a-110d may support one or multiple (for example, three) cells. The terms "eNB", "base station", "NR BS", "gNB", "TRP", "AP", "computing platform B", "5G NB", and "cell" may be used interchangeably herein.

In some examples, a cell may not be stationary, and the geographic area of the cell may move according to the location of a mobile base station. In some examples, the base stations 110a-110d may be interconnected to one another as well as to one or more other base stations or network computing platforms (not illustrated) in the communications system 100 through various types of backhaul interfaces, such as a direct physical connection, a virtual network, or a combination thereof using any suitable transport network The base station 110a-110d may communicate with the core network 140 over a wired or wireless communication link 126. The wireless device 120a-120e may communicate with the base station 110a-110d over a wireless communication link 122.

The wired communication link 126 may use a variety of wired networks (such as Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/Internet Protocol (TCP/IP).

The communications system 100 also may include relay stations (such as relay BS 110d). A relay station is an entity that can receive a transmission of data from an upstream station (for example, a base station or a mobile device) and send a transmission of the data to a downstream station (for example, a wireless device or a base station). A relay station also may be a mobile device that can relay transmissions for other wireless devices. In the example illustrated in FIG. 1, a relay station 110d may communicate with macro base station 110a and the wireless device 120d in order to facilitate communication between the base station 110a and the wireless device 120d. A relay station also may be referred to as a relay base station, a relay base station, a relay, etc.

The communications system 100 may be a heterogeneous network that includes base stations of different types, for example, macro base stations, pico base stations, femto base stations, relay base stations, etc. These different types of base stations may have different transmit power levels, different coverage areas, and different impacts on interference in communications system 100. For example, macro base stations may have a high transmit power level (for example, 5 to 40 Watts) whereas pico base stations, femto base stations, and relay base stations may have lower transmit power levels (for example, 0.1 to 2 Watts).

A network controller 130 may couple to a set of base stations and may provide coordination and control for these base stations. The network controller 130 may communicate with the base stations via a backhaul. The base stations also may communicate with one another, for example, directly or indirectly via a wireless or wireline backhaul.

The wireless devices 120a, 120b, 120c may be dispersed throughout communications system 100, and each wireless device may be stationary or mobile. A wireless device also may be referred to as an access terminal, a terminal, a mobile station, a subscriber unit, a station, etc.

A macro base station 110a may communicate with the communication network 140 over a wired or wireless communication link 126. The wireless devices 120a, 120b, 120c may communicate with a base station 110a-110d over a wireless communication link 122.

The wireless communication links 122 and 124 may include a plurality of carrier signals, frequencies, or frequency bands, each of which may include a plurality of logical channels. The wireless communication links 122 and 124 may utilize one or more radio access technologies (RATs). Examples of RATs that may be used in a wireless communication link include 3GPP LTE, 3G, 4G, 5G (such as NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (such as LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth also may be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some implementations may use terminology and examples associated with LTE technologies, various implementations may be applicable to other wireless communications systems, such as a new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 subcarriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding also may be supported. MIMO configurations in the DL may support up to eight transmit antennas with multi-layer DL transmissions up to eight streams and up to two streams per wireless device. Multi-layer transmissions with up to 2 streams per wireless device may be supported.

Aggregation of multiple cells may be supported with up to eight serving cells. Alternatively, NR may support a different air interface, other than an OFDM-based air interface.

Some mobile devices may be considered machine-type communication (MTC) or evolved or enhanced machine-type communication (eMTC) mobile devices. MTC and eMTC mobile devices include, for example, robots, drones, remote devices, sensors, meters, monitors, location tags, etc., that may communicate with a base station, another device (for example, remote device), or some other entity. A wireless computing platform may provide, for example, connectivity for or to a network (for example, a wide area network such as Internet or a cellular network) via a wired or wireless communication link. Some mobile devices may be considered Internet-of-Things (IoT) devices or may be implemented as NB-IoT (narrowband internet of things) devices. The wireless device 120 may be included inside a housing that houses components of the wireless device 120, such as processor components, memory components, similar components, or a combination thereof.

In general, any number of communications systems and any number of wireless networks may be deployed in a given geographic area. Each communications system and wireless network may support a particular radio access technology (RAT) and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between communications systems of different RATs. In some cases, NR or 5G RAT networks may be deployed.

In some implementations, two or more mobile devices (for example, illustrated as the wireless device 120*a* and the wireless device 120*e*) may communicate directly using one or more sidelink channels (for example, without using a base station 110*a-d* as an intermediary to communicate with one another). For example, the wireless devices 120*a-e* may communicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the wireless device 120 may perform scheduling operations, resource selection operations, as well as other operations described elsewhere herein as being performed by the base station 110.

Figure 2:
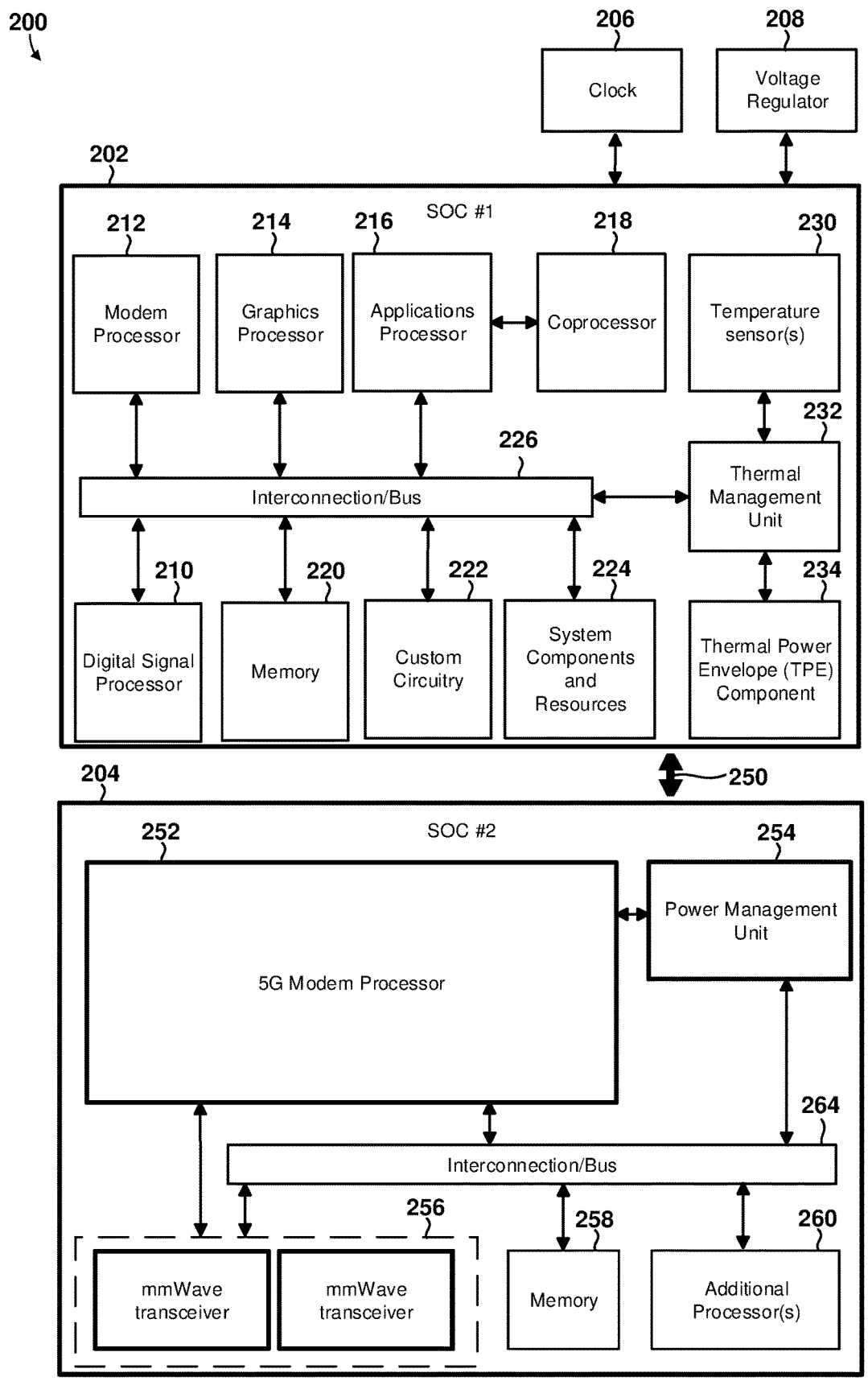
FIG. 2 shows a component block diagram illustrating an example computing system that may be configured to implement management of cell selection.

FIG. 2 shows a component block diagram illustrating an example computing system that may be configured to implement management of cell selection. Various implementations may be implemented on a number of single processor and multiprocessor computer systems, including a system-on-chip (SOC) or system in a package (SIP). The example illustrated in FIG. 2 is a SIP 200 architecture that may be used in wireless devices implementing the various implementations.

With reference to FIGS. 1 and 2, the illustrated example SIP 200 includes a two SOCs 202, 204, a clock 206, and a voltage regulator 208. In some implementations, the first SOC 202 operate as central processing unit (CPU) of the wireless device that carries out the instructions of software application programs by performing the arithmetic, logical, control and input/output (I/O) operations specified by the instructions. In some implementations, the second SOC 204 may operate as a specialized processing unit. For example, the second SOC 204 may operate as a specialized 5G processing unit responsible for managing high volume, high speed (such as 5 Gbps, etc.), or very high frequency short wave length (such as 28 GHz mmWave spectrum, etc.) communications.

The first SOC 202 may include a digital signal processor (DSP) 210, a modem processor 212, a graphics processor 214, an application processor 216, one or more coprocessors 218 (such as vector co-processor) connected to one or more of the processors, memory 220, custom circuity 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (such as FreeBSD, LINUX, OS X, etc.) and a processor that executes a second type of operating system (such as MICROSOFT WINDOWS 10). In addition, any or all of the processors 210, 212, 214, 216, 218, 252, 260 may be included as part of a processor cluster architecture (such as a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 or custom circuitry 222 also may include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates or implement a bus architecture (such as CoreConnect, AMBA, etc.). Communications may be provided by advanced interconnects, such as high-performance networks-on chip (NoCs).

The first or second SOCs 202, 204 may further include an input/output module (not illustrated) for communicating with resources external to the SOC, such as a clock 206 and a voltage regulator 208. Resources external to the SOC (such as clock 206, voltage regulator 208) may be shared by two or more of the internal SOC processors/cores.

In addition to the example SIP 200 discussed above, various implementations may be implemented in a wide variety of computing systems, which may include a single processor, multiple processors, multicore processors, or any combination thereof.

Figure 3:
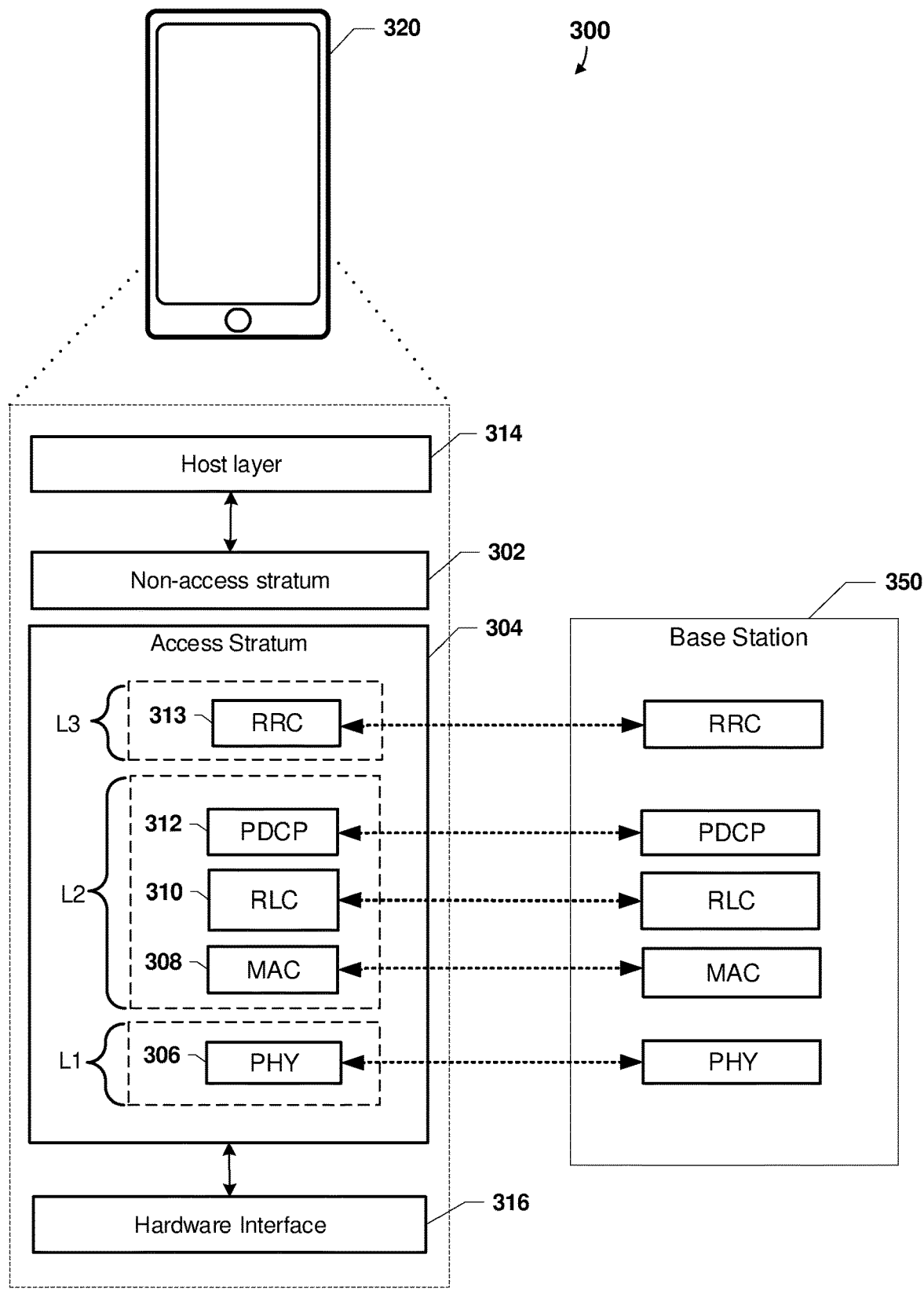
FIG. 3 shows a component block diagram of an example of a software architecture including a radio protocol stack for the user and control planes in wireless communications.

FIG. 3 shows a component block diagram of an example of a software architecture 300 including a radio protocol stack for the user and control planes in wireless communications. The software architecture 300 including a radio protocol stack for the user and control planes in wireless communications between a base station 350 (such as the base station 110a) and a wireless device 320 (such as the wireless device 120a-120e, 200). With reference to FIGS. 1-3, the wireless device 320 may implement the software architecture 300 to communicate with the base station 350 of a communication system (such as 100). In various implementations, layers in software architecture 300 may form logical connections with corresponding layers in software of the base station 350. The software architecture 300 may be distributed among one or more processors (such as the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (such as two protocol stacks associated with two SIMs, respectively, in a dual-SIM wireless communication device). While described below with reference to LTE communication layers, the software architecture 300 may support any of variety of standards and protocols for wireless communications, or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (such as SIM(s) 204) and its core network 140. The AS 304 may include functions and protocols that support communication between a SIM(s) (such as SIM(s) 204) and entities of supported access networks (such as a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the Physical Downlink Control Channel (PDCCH) and the Physical Downlink Shared Channel (PDSCH).

In the user and control planes, Layer 2 (L2) of the AS 304 may be responsible for the link between the wireless device 320 and the base station 350 over the physical layer 306. In the various implementations, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various implementations, the RRC sublayer 313 may provide functions INCLUDING broadcasting system information, paging, and establishing and releasing an RRC signaling connection between the wireless device 320 and the base station 350.

In various implementations, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some implementations, application-specific functions provided by the at least one host layer 314 may provide an interface between the software architecture and the general purpose processor 206.

In other implementations, the software architecture 300 may include one or more higher logical layer (such as transport, session, presentation, application, etc.) that provide host layer functions. For example, in some implementations, the software architecture 300 may include a network layer (such as IP layer) in which a logical connection terminates at a packet data network (PDN) gateway (PGW). In some implementations, the software architecture 300 may include an application layer in which a logical connection terminates at another device (such as end user device, server, etc.). In some implementations, the software architecture 300 may further include in the AS 304 a hardware interface 316 between the physical layer 306 and the communication hardware (such as one or more radio frequency (RF) transceivers).

Figure 4:
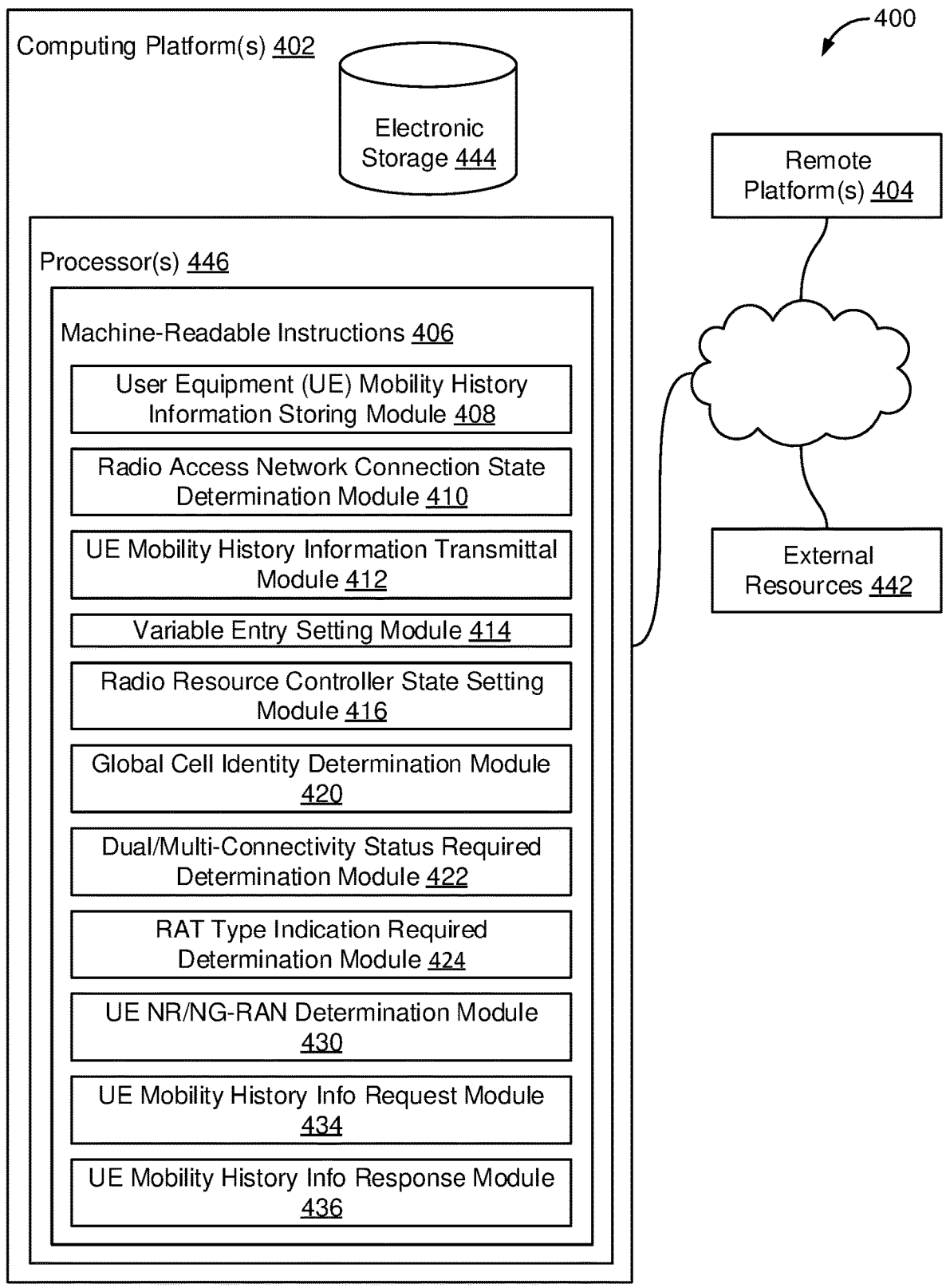
FIG. 4 shows a component block diagram illustrating an example system configured for providing UE mobility history information.

FIG. 4 shows a component block diagram illustrating an example system 400 configured for providing UE mobility history information. In some implementations, the system 400 may include one or more computing platform(s) 402 or one or more remote platforms 404. With reference to FIGS. 1-4, the computing platform(s) 402 may include a base station (such as the base station 110, 350) or a wireless device (such as the wireless device 120a-120e, 200, 320). The remote platform(s) 404 may include a base station (such as the base station 110, 350), remote from the computing platform(s) 402, or a wireless device (such as the wireless device 120a-120e, 200, 320).

Computing platform(s) 402 may be configured by machine-readable instructions 406. Machine-readable instructions 406 may include one or more instruction modules. The instruction modules may include computer program modules. The instruction modules may include one or more of UE mobility history information storing module 408, RAN connection state determination module 410, UE mobility history information transmittal module 412, variable entry setting module 414, radio resource controller state setting module 416, mobility history information transmission module 418, global cell identity determination module 420, dual/multi-connectivity status required determination module 422, radio access technology (RAT) type indication required determination module 424, cell identity carrier frequency module 428, UE new radio/next generation radio access network (NR/NG-RAN) determination module 430, UE mobility history information request module 434, UE mobility history information response module 436, UE mobility history information receiving module 438, UE mobility history information comparing module 440, or other instruction modules.

The UE mobility history information storing module 408 may be configured to store UE mobility history information in memory within the UE.

Radio access network connection state determination module 410 may be configured to determine whether a RAN connection state of the UE has changed from a primary cell in a radio resource controller state (such as RRC_CONNECT, RRC_IDLE, RRC_INACTIVE) to another cell outside a RAN, to an inter-radio access technology cell, or to an out of service state.

UE mobility history information transmittal module 412 may be configured to transmit the UE mobility history information to a remote computing platform in response to determining that the RAN connection state of the UE has changed from a primary cell in a radio resource controller state to another cell outside a RAN, to an inter-radio access technology cell, or to an out of service state. In some implementations, transmitting the UE mobility history information may be part of a handover preparation procedure, a context retrieval procedure, a UE suspend procedure, or a UE context release complete procedure.

The variable entry setting module 414 may be configured to set the time spent for each radio resource controller state with a previous primary cell or a previous secondary cell in a variable entry of the UE mobility history information in response to determining the RAN connection state of the UE has changed from a primary cell in a radio resource controller state to another cell outside a RAN, to an inter-radio access technology cell, or to an out of service state. In addition, the variable entry setting module 414 may be configured to set the radio resource controller state for each radio resource controller state of a previous primary cell or a previous secondary cell in the variable entry of the UE mobility history information in response to determining the RAN connection state of the UE has changed from a primary cell in a radio resource controller state to another cell outside a RAN, to an inter-radio access technology cell, or to an out of service state. In some implementations, the variable entry setting module 414 may be configured to include in a variable entry of the UE mobility history information, a current global cell identity, a global cell identity of a previous primary cell or a previous secondary cell, an indication of the radio access technology, or a physical cell identity and carrier frequency of the previous or secondary cell.

The radio resource controller state setting module 416 may be configured to set the radio resource controller state for each radio resource controller state of a previous primary cell or a previous secondary cell in a variable entry of the UE mobility history information.

The global cell identity determination module 420 may be configured to determine whether the global cell identity of a previous primary cell or a previous secondary cell is available.

The dual/multi-connectivity status required determination module 422 may be configured to determine whether a dual/multi-connectivity status is required.

The RAT type indication required determination module 424 may be configured to determine whether a RAT indication is required.

The NR/NG-RAN determination module 430 may be configured to determine whether the UE has entered a new radio or next generation RAN while previously out of service or using another radio access technology.

The mobility history information request module 434 may be configured to receive from the remote computing platform a UE information request.

The UE mobility history information response module 436 may be configured to transmit a UE information response indicating the UE mobility history information is available to the remote computing platform.

Figure 5A:
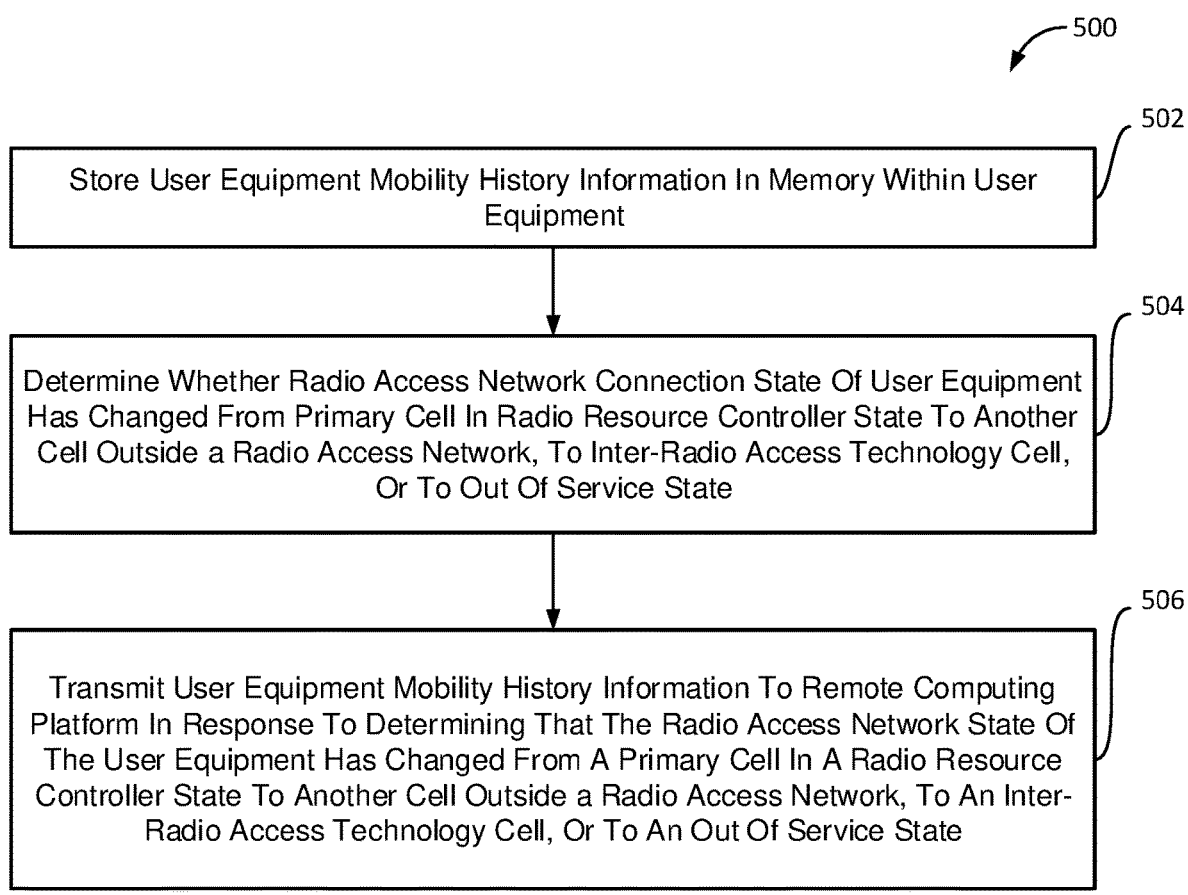
FIG. 5A shows a process flow diagram of an example method, performed by a processor of UE, for providing UE mobility history information to a remote computing platform.

FIG. 5A shows a process flow diagram of an example method 500, performed by a processor of UE, for providing UE mobility history information to a remote computing platform. With reference to FIG. 1-5A, the operations of the method 500 may be performed by a processor of a computing platform (such as the wireless device 120a-120e, 200, 320) or a remote computing platform (such as base stations 110a-110d, 350).

In block 502, the processor may store UE mobility history information in memory within the UE. The mobility history information may be collected, compiled, or stored with or without network configuration details. In various implementations, the mobility history information may include at least one data set selected from a listing of visited cells (such as visitedCellList), an indication of how long the UE shall store the mobility history information (i.e., a time period), an indication of an area within which the UE is configured to store mobility history information (such as a cell list, a remote network access list, or a timing advance list), a RAT type (such as NR, NG-RAN, or evolved universal mobility telecommunication system terrestrial radio access (E-UTRA), connectivity state information (such as dual/multi-connectivity state information (EN-DC, NE-DC, NGEN-DC, or NR-DC), or RRC state information (such as RRC_CONNECTED, RRC_INACTIVE, RRC_IDLE). The RRC state information may be included whether the UE needs to store a visited cell list for each RRC state, on connected mode, or in an idle/inactive state.

In block 504, the processor may determine whether a RAN connection state of the UE has changed from a primary cell in a radio resource controller state to another cell outside a RAN, to an inter-radio access technology cell, or to an out of service state. In some implementations, the radio resource controller states may include RRC_CONNECT, RRC_IDLE, and RRC_INACTIVE.

In block 506, the processor may transmit the UE mobility history information to a remote computing platform in response to determining that the UE changed cell or changed state within the cell. In some implementations, the mobility history information may be transmitted in new separate RRC signaling (such as a mobility history information collection configuration) or in existing RRC signaling (such as "RRCReconfiguration" or "loggedMeasurmentConfiguration").

FIGS. 5B-5K show process flow diagrams of example operations that may be performed as part of the method 500 for providing UE mobility history information to a remote computing platform. With reference to FIGS. 1-5K, the example operations may be implemented by a processor (such as 212, 216, 252 or 260) of UE (such as the wireless devices 120a-120e, 200, 320).

Figure 5B:
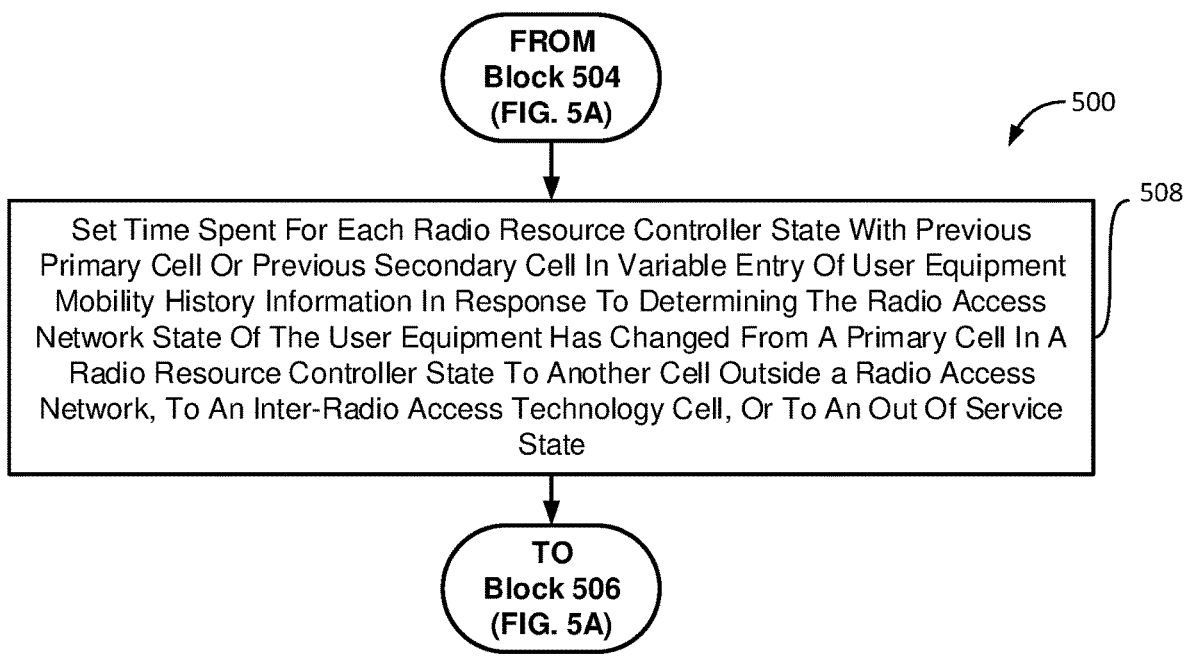
FIGS. 5B-5K show process flow diagrams of example operations that may be performed as part of the method for providing UE mobility history information to a remote computing platform by a processor of UE.

Referring to FIG. 5B, in some implementations following the operations of block 504 (FIG. 5A), the processor may set the time spent for each radio resource controller state with a previous primary cell or a previous secondary cell in a variable entry of the UE mobility history information in response to determining the RAN connection state of the UE has changed from a primary cell in a radio resource controller state to another cell outside a RAN, to an inter-radio access technology cell, or to an out of service state, in block 508.

Following the operations of block 508, the processor may perform the operations of block 506 (FIG. 5A).

Figure 5C:
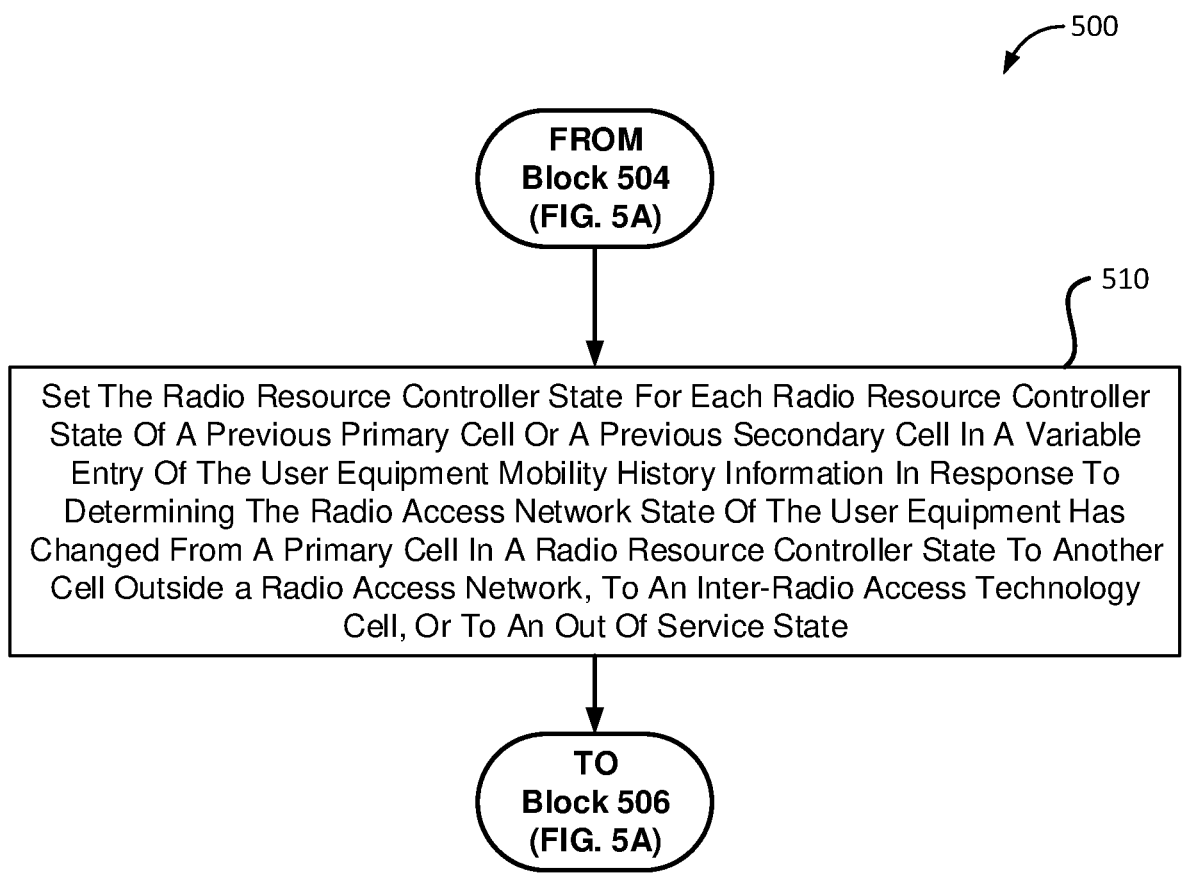

Referring to FIG. 5C, in some implementations following the operations of block 504 (FIG. 5A), the processor may set the radio resource controller state for each radio resource controller state of a previous primary cell or a previous secondary cell in the variable entry of the UE mobility history information in response to determining the RAN connection state of the UE has changed from a primary cell in a radio resource controller state to another cell outside a RAN, to an inter-radio access technology cell, or to an out of service state, in block 510.

Following the operations of block 510, the processor may perform the operations of block 506 (FIG. 5A).

Figure 5D:
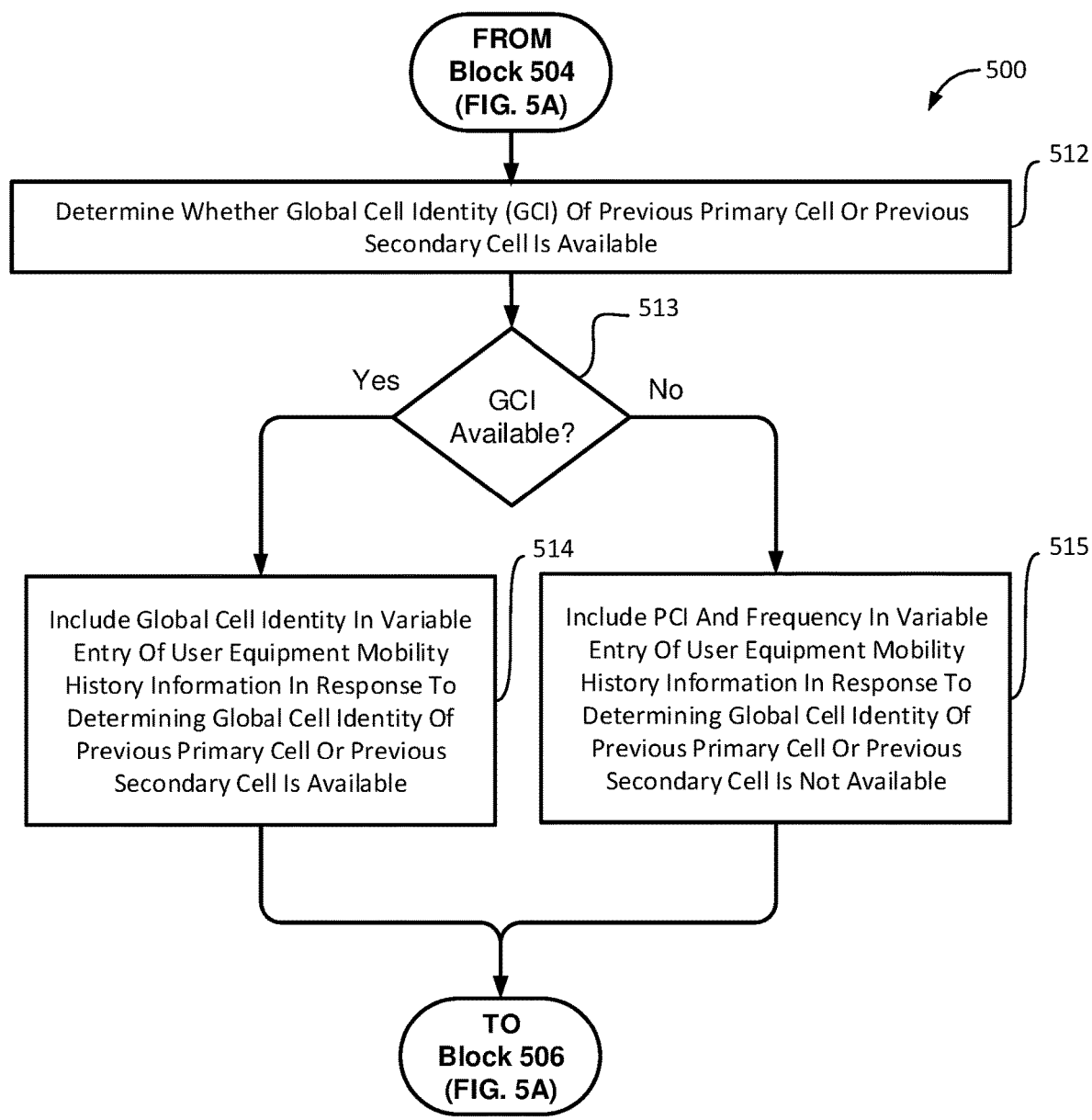

Referring to FIG. 5D, in some implementations following the operations of block 504 (FIG. 5A), the processor may determine whether the global cell identity of a previous primary cell or a previous secondary cell is available, in block 512 and determination block 513.

In block 514, the processor may include the global cell identity in a variable entry of the UE mobility history information in response to determining the that global cell identity of the previous primary cell or the previous secondary cell is available (i.e., determination block 513="Yes").

In block 515, the processor may include a physical cell identity and frequency in a variable entry of the UE mobility history information in response to determining that the global cell identity of the previous primary cell or the previous secondary cell is not available (i.e., determination block 513="No").

Following the operations of either block 514 or block 515, the processor may perform the operations of block 506 (FIG. 5A).

Figure 5E:
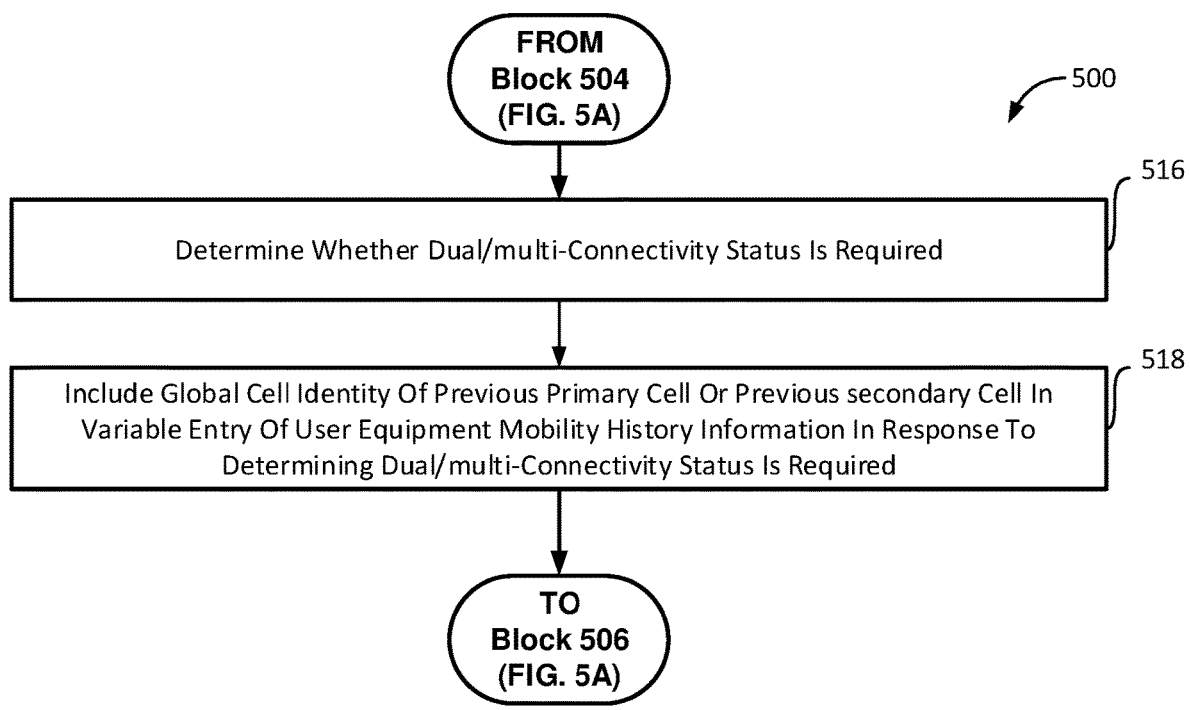

Referring to FIG. 5E, in some implementations following the operations of block 504 (FIG. 5A), the processor may determine whether a dual/multi-connectivity status is required, in block 516.

In block 518, the processor may include a global cell identity of a previous primary cell or a previous secondary cell in a variable entry of the UE mobility history information in response to determining the dual/multi-connectivity status is required.

Following the operations of block 518, the processor may perform the operations of block 506 (FIG. 5A).

Figure 5F:
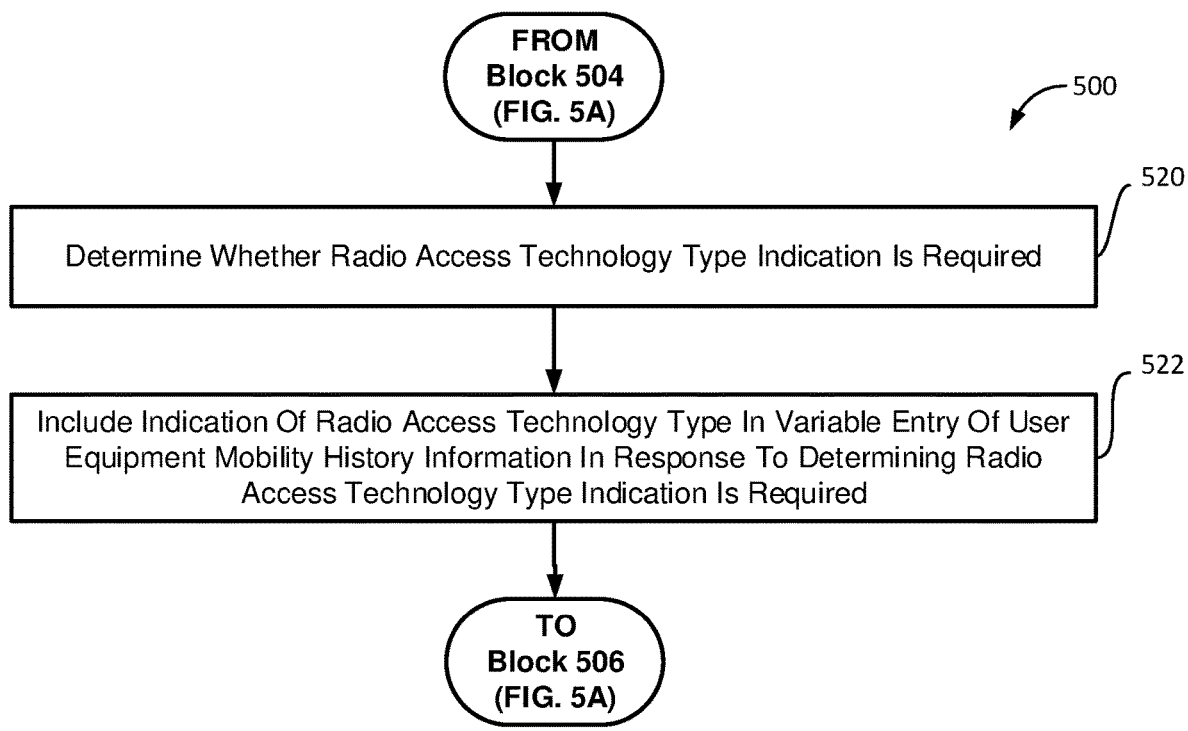

Referring to FIG. 5F, in some implementations following the operations of block 504 (FIG. 5A), the processor may determine whether a radio access technology type indication is required, in block 520.

In block 522, the processor may include an indication of the radio access technology in a variable entry of the UE mobility history information in response to determining the radio access technology type indication is required.

Following the operations of block 522, the processor may perform the operations of block 506 (FIG. 5A).

Figure 5G:
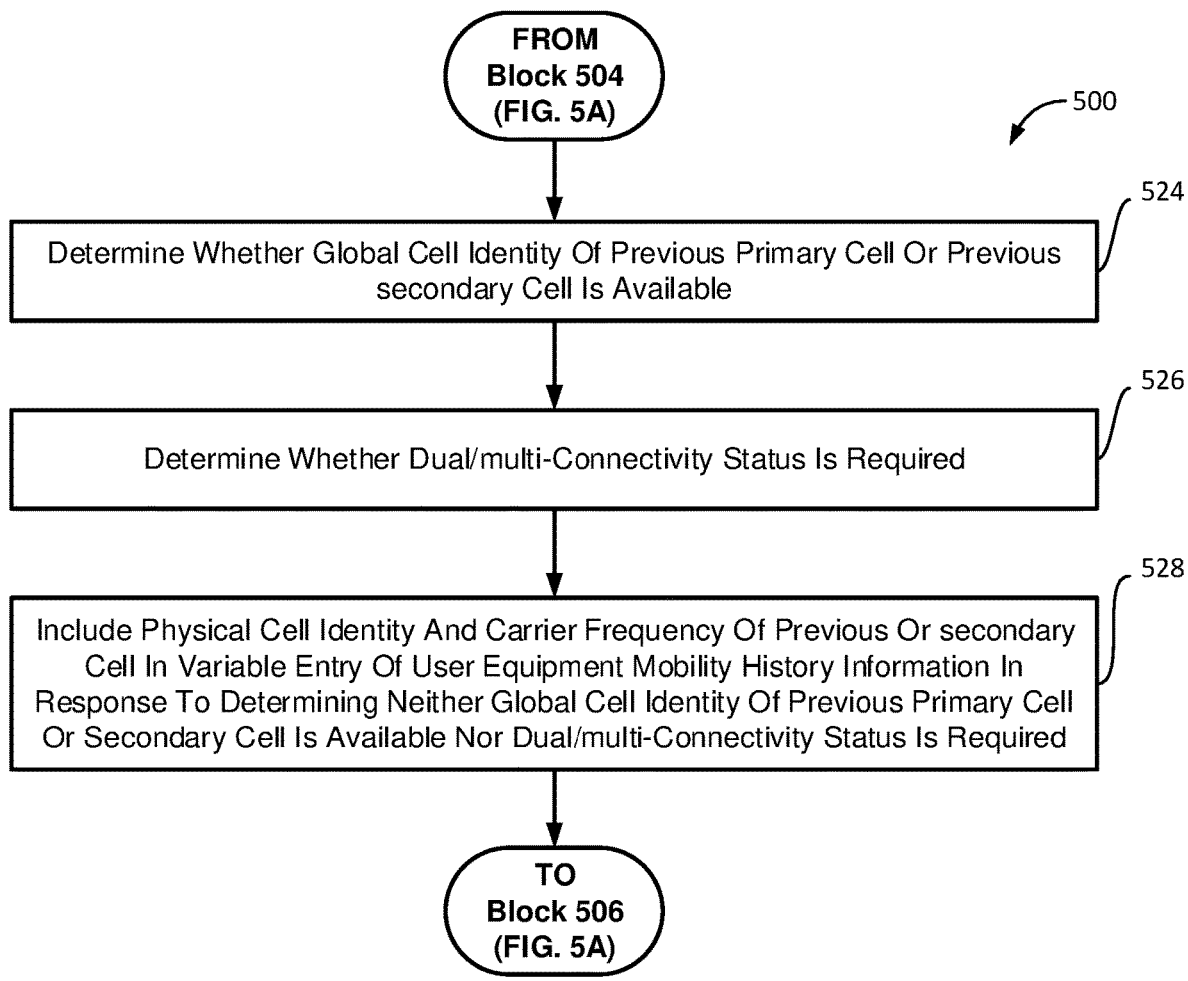

Referring to FIG. 5G, in some implementations following the operations of block 504 (FIG. 5A), the processor determine whether the global cell identity of the previous primary cell or secondary cell is available, in block 524. In some implementations, the determination in block 524 may be the same or similar to the determination in block 512 (FIG. 5D).

In block 526, the processor may determine whether a dual/multi-connectivity status is required. In some implementations, the determination in block 526 may be the same or similar to the determination in block 516 (FIG. 5E).

In block 528, the processor may include a physical cell identity and carrier frequency of the previous primary cell or secondary cell in a variable entry of the UE mobility history information in response to determining neither the global cell identity of the previous primary cell or secondary cell is available nor the dual/multi-connectivity status is required.

Following the operations of block 528, the processor may perform the operations of block 506 (FIG. 5A).

Figure 5H:
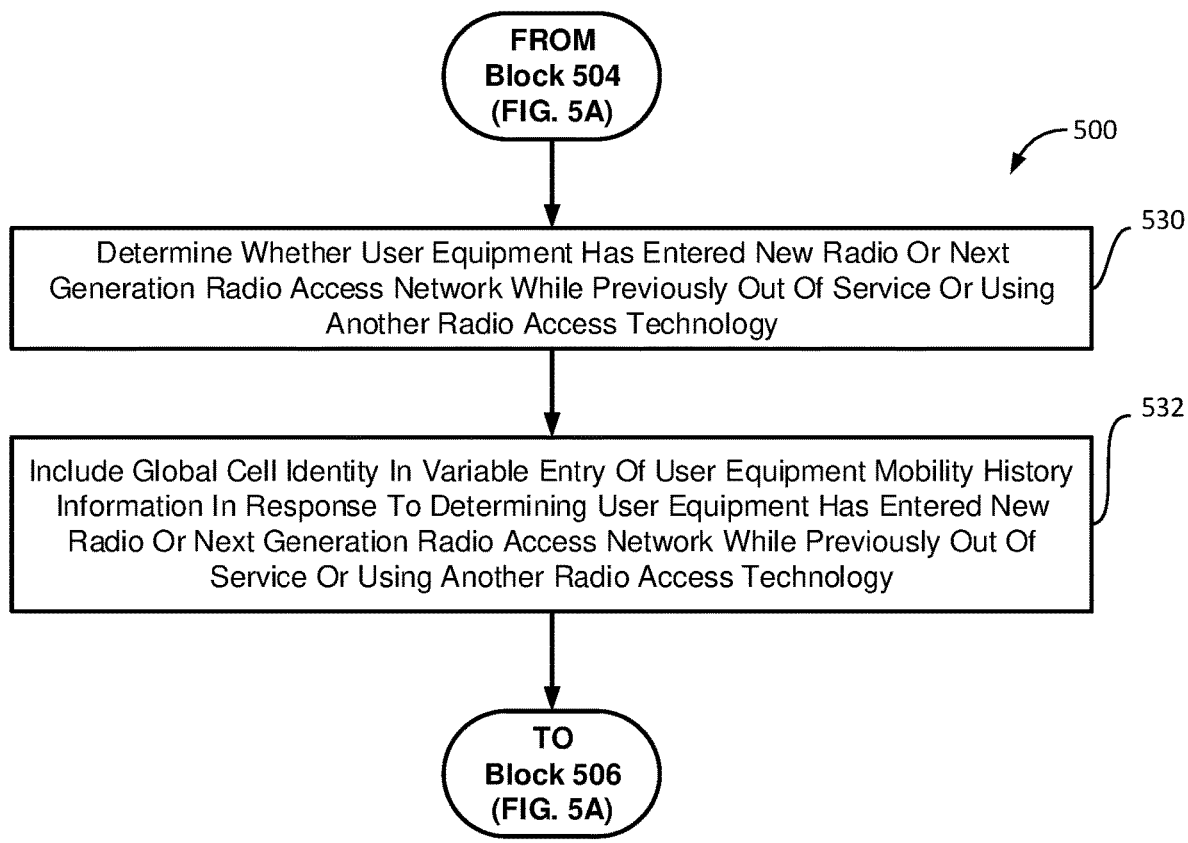

Referring to FIG. 5H, in some implementations following the operations of block 504 (FIG. 5A), the processor may determine whether the UE has entered a new radio or next generation RAN while previously out of service or using another radio access technology, in block 530.

In block 532, the processor may include the global cell identity in a variable entry of the UE mobility history information in response to determining the UE has entered a new radio or next generation RAN while previously out of service or using another radio access technology.

Following the operations of block 532, the processor may perform the operations of block 506 (FIG. 5A).

Figure 5I:
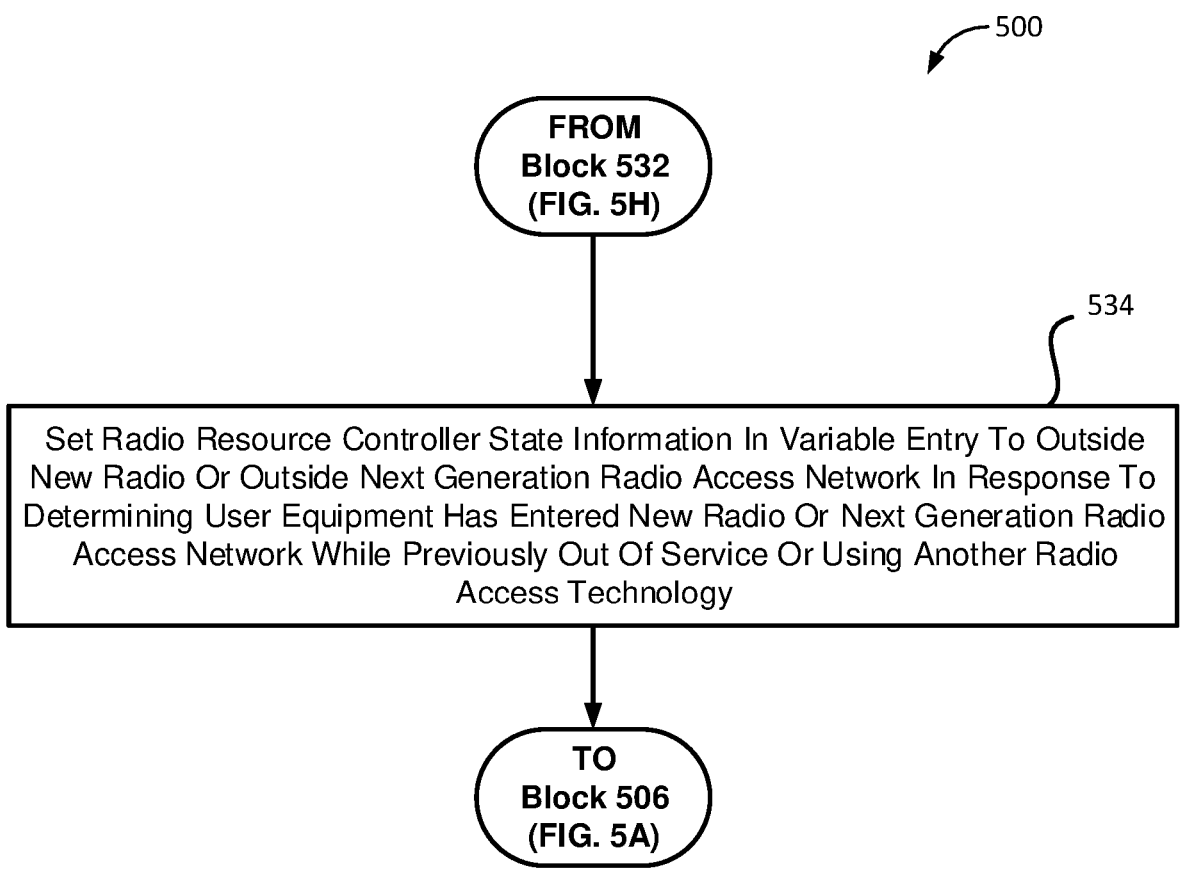

Referring to FIG. 5I, in some implementations following the operations of block 532 (FIG. 5H), the processor may set the radio resource controller state information in the variable entry to outside new radio or outside next generation RAN in response to determining the UE has entered a new radio or next generation RAN while previously out of service or using another radio access technology, in block 534.

Following the operations of block 534, the processor may perform the operations of block 506 (FIG. 5A).

Figure 5J:
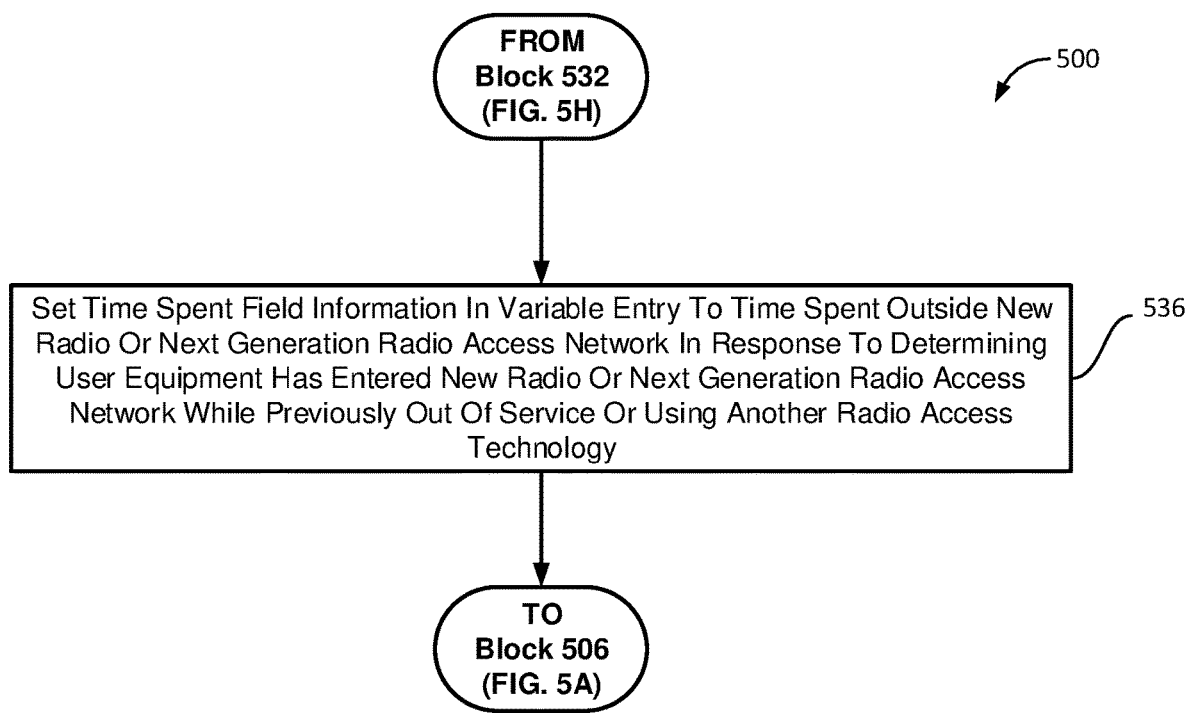

Referring to FIG. 5J, in some implementations following the operations of block 532 (FIG. 5H), the processor may set the time spent field information in the variable entry to the time spent outside the new radio or the next generation RAN in response to determining the UE has entered a new radio or next generation RAN while previously out of service or using another radio access technology, in block 536.

Following the operations of block 536, the processor may perform the operations of block 506 (FIG. 5A).

Figure 5K:
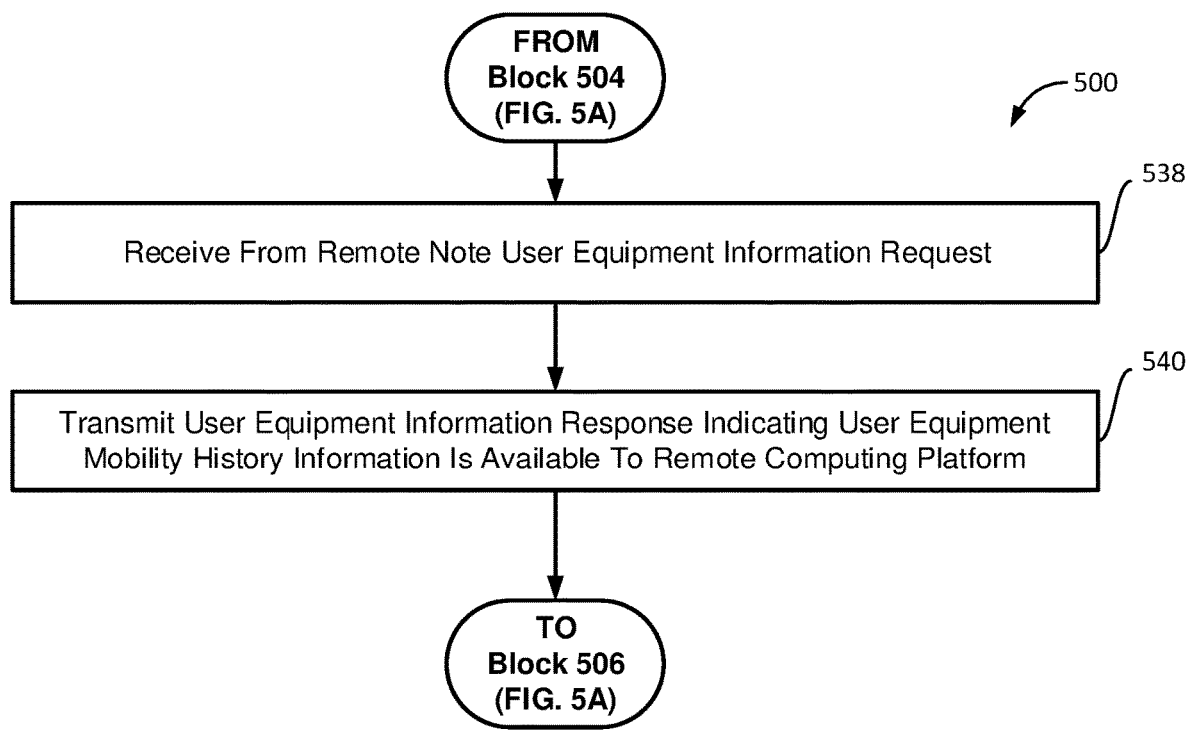

Referring to FIG. 5K, in some implementations following the operations of block 504 (FIG. 5A), the processor may receive from the remote computing platform a UE information request, in block 538.

In block 540, the processor may transmit a UE information response indicating the UE mobility history information is available to the remote computing platform.

Following the operations of block 540, the processor may perform the operations of block 506 (FIG. 5A).

Figure 6A:
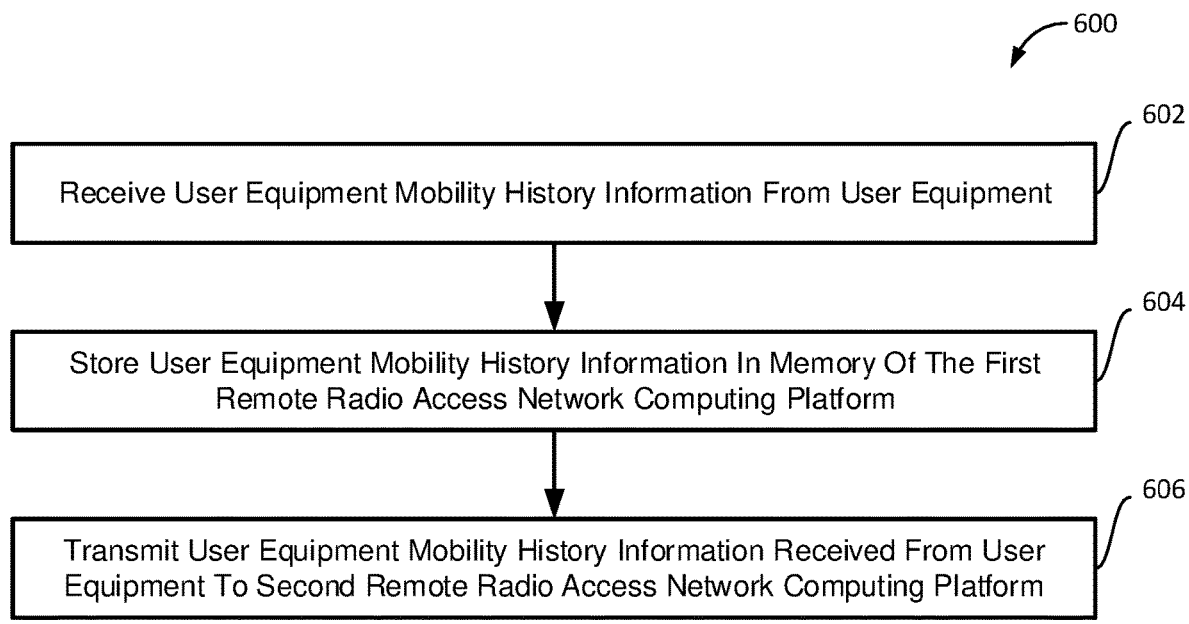
FIG. 6A shows a process flow diagram of an example method, performed by a processor of a first remote RAN computing platform, for providing UE mobility history information to a second remote RAN computing platform.

FIG. 6A shows a process flow diagram of an example method 600, performed by a processor of a first remote RAN computing platform, for providing UE mobility history information to a second remote RAN computing platform in accordance with various implementations. With reference to FIGS. 1-6A, the method 600 may be implemented by a processor (such as 212, 216, 252 or 260) of the computing platform (such as such as base stations 110a-110d, 350).

In block 602, the processor may receive UE mobility history information from UE.

In block 604, the processor may store the UE mobility history information in memory of the first remote RAN computing platform.

In block 606, the processor may transmit the UE mobility history information received from the UE to a second remote RAN computing platform remote from the first remote RAN computing platform. In some implementations, the UE mobility history information received from the UE may be transmitted as part of a handover preparation procedure, a context retrieval procedure, a UE suspend procedure, or a UE context release complete procedure. In this way, the mobility history information collected by a UE and retrieved by one gNB may be propagated to the another node by means of handover preparation procedures over Xn/N2 and a UE Context Retrieval procedure over Xn.

Figure 6B:
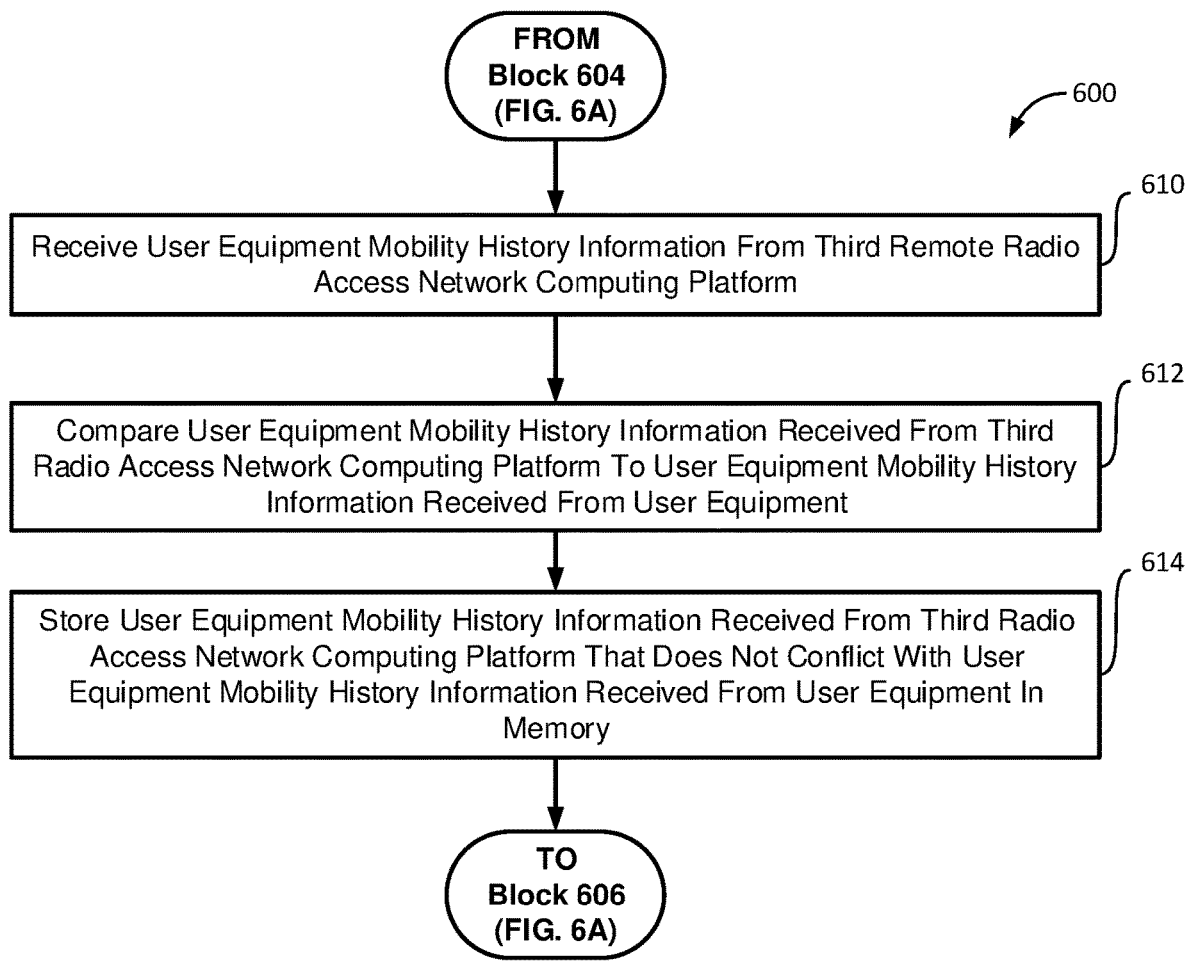
FIG. 6B shows a process flow diagram of example operations that may be performed as part of the method for providing UE mobility history information to a second remote RAN computing platform.

FIG. 6B shows a process flow diagram of example operations that may be performed as part of the method 600 for providing UE mobility history information to a remote computing platform. With reference to FIGS. 1-6B, the example operations may be implemented by a processor (such as 212, 216, 252 or 260) of the computing platform (such as such as base stations 110a-110d, 350).

In some implementations following the operations of block 604 (FIG. 6A), the processor may receive UE mobility history information from a third remote RAN computing platform, in block 610.

In block 612, the processor may compare the UE mobility history information received from the third RAN computing platform to the UE mobility history information received from the UE.

In block 614, the processor may store the UE mobility history information received from the third RAN computing platform that does not conflict with the UE mobility history information received from the UE in the memory of the first remote RAN computing platform.

Following the operations of block 614, the processor may perform the operations of block 606 (FIG. 6A).

Figure 7:
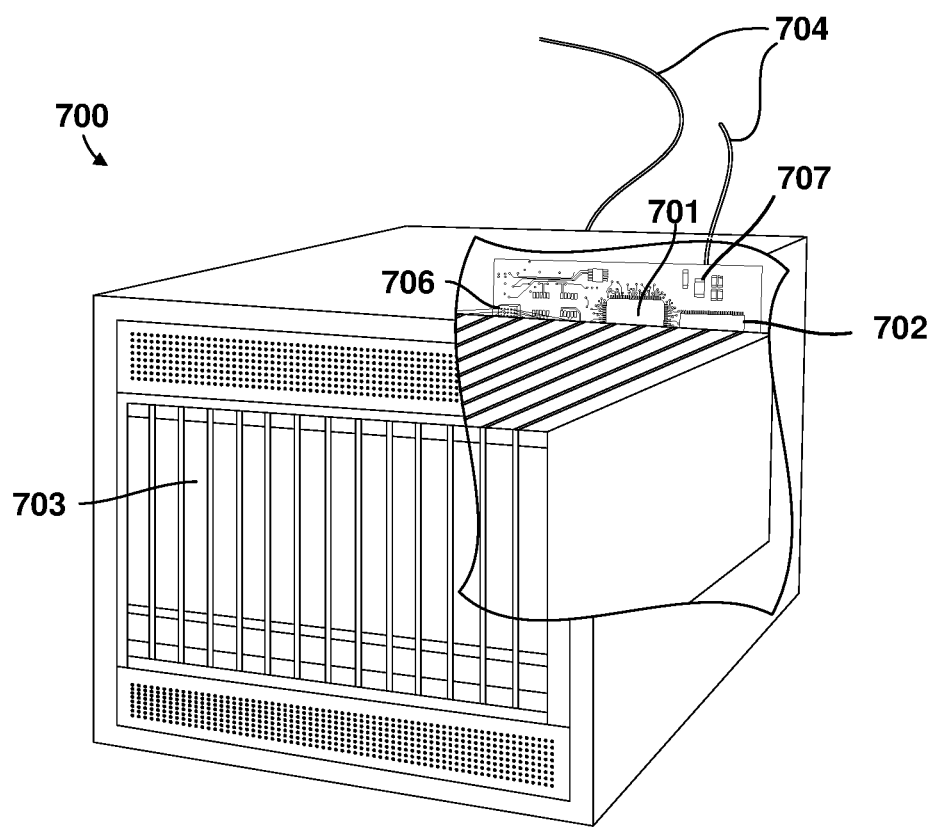
FIG. 7 shows a component block diagram of an example remote computing platform.

FIG. 7 shows a component block diagram of an example remote computing platform 700. In some implementations, the remote computing platform 700 may function as a network element of a communication network, such as a base station. The remote computing platform 700 may include at least the components illustrated in FIG. 7. With reference to FIGS. 1-7, a remote computing platform 700 may include a processor 701 coupled to volatile memory 702 and a large capacity nonvolatile memory, such as a disk drive 703. The remote computing platform 700 also may include a peripheral memory access device such as a floppy disc drive, compact disc (CD) or digital video disc (DVD) drive 706 coupled to the processor 701. The remote computing platform 700 also may include network access ports 704 (or interfaces) coupled to the processor 701 for establishing data connections with a network, such as the Internet or a local area network coupled to other system computers and servers. The remote computing platform 700 may include one or more antennas 707 for sending and receiving electromagnetic radiation that may be connected to a wireless communication link. The network computing device 700 may include additional access ports, such as USB, Firewire, Thunderbolt, and the like for coupling to peripherals, external memory, or other devices.

Figure 8:
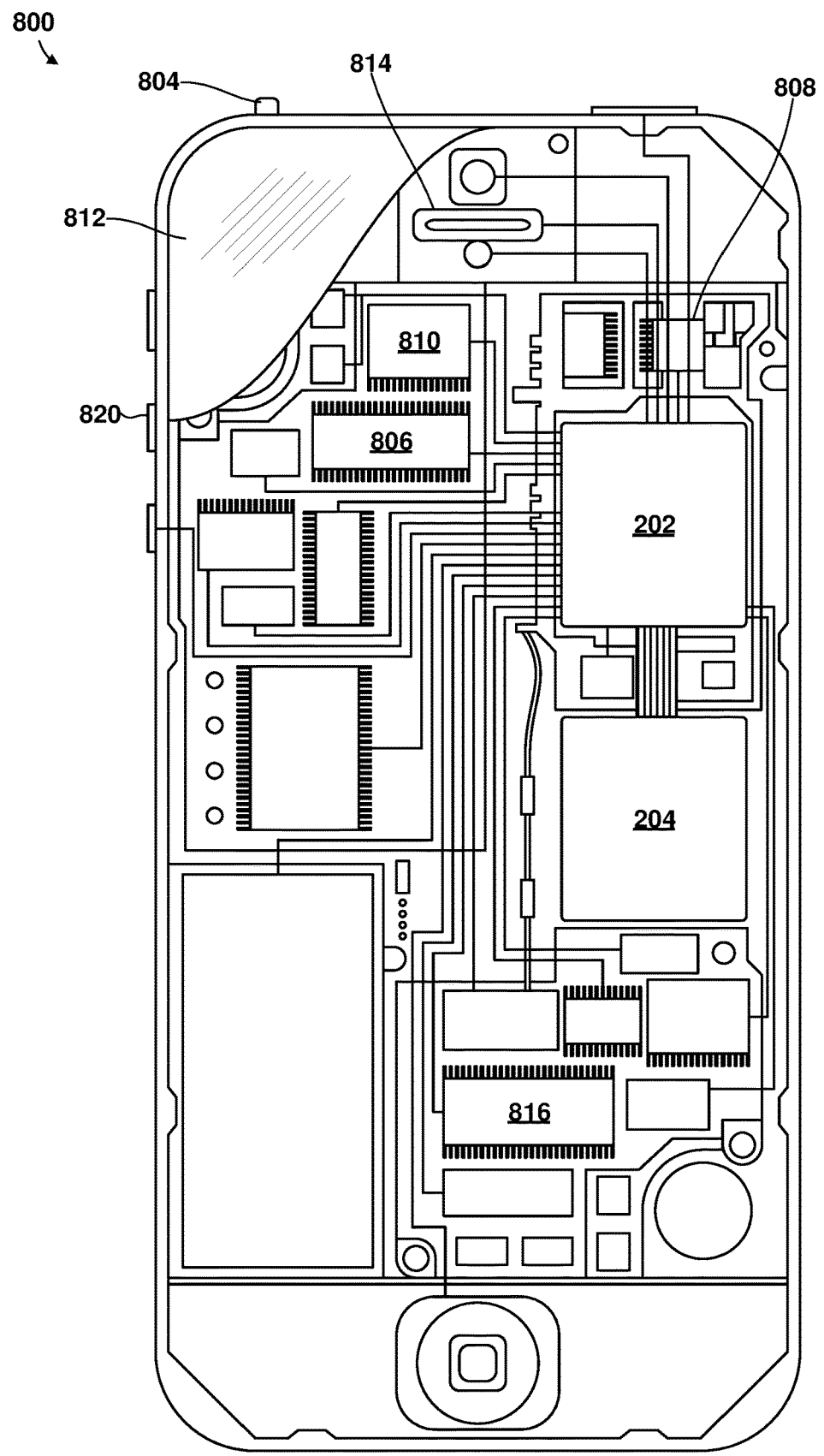
FIG. 8 shows a component block diagram of an example UE.

FIG. 8 shows a component block diagram of an example UE. Various implementations may be implemented on a variety of wireless devices (such as the wireless device 120a-120e, 200, 320), an example of which is illustrated in FIG. 8 in the form of a smartphone 800. The smartphone 800 may include a first SOC 202 (such as a SOC-CPU) coupled to a second SOC 204 (such as a 5G capable SOC). The first and second SOCs 202, 204 may be coupled to internal memory 806, 816, a display 812, and to a speaker 814. Additionally, the smartphone 800 may include an antenna 804 for sending and receiving electromagnetic radiation that may be connected to a wireless data link or cellular telephone transceiver 808 coupled to one or more processors in the first or second SOCs 202, 204. Smartphones 800 typically also include menu selection buttons or rocker switches 820 for receiving user inputs.

A typical smartphone 800 also includes a sound encoding/decoding (CODEC) circuit 810, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 808 and CODEC 810 may include a digital signal processor (DSP) circuit (not shown separately).

The processors of the wireless network computing device 700 and the smart phone 800 may be any programmable microprocessor, microcomputer or multiple processor chip or chips that can be configured by software instructions (applications) to perform a variety of functions, including the functions of the various implementations described below. In some mobile devices, multiple processors may be provided, such as one processor within an SOC 204 dedicated to wireless communication functions and one processor within an SOC 202 dedicated to running other applications. Typically, software applications may be stored in the memory 806, 816 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, or a computer. By way of illustration, both an application running on a wireless device and the wireless device may be referred to as a component. One or more components may reside within a process or thread of execution and a component may be localized on one processor or core or distributed between two or more processors or cores. In addition, these components may execute from various non-transitory computer readable media having various instructions or data structures stored thereon. Components may communicate by way of local or remote processes, function or procedure calls, electronic signals, data packets, memory read/writes, and other known network, computer, processor, or process related communication methodologies.

A number of different cellular and mobile communication services and standards are available or contemplated in the future, all of which may implement and benefit from the various implementations. Such services and standards include, such as third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (such as cdmaOne, CDMA1020TM), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, or content messages. It should be understood that any references to terminology or technical details related to an individual telecommunication standard or technology are for illustrative purposes only, and are not intended to limit the scope of the claims to a particular communication system or technology unless specifically recited in the claim language.

Various implementations illustrated and described are provided merely as examples to illustrate various features of the claims. However, features shown and described with respect to any given implementation are not necessarily limited to the associated implementation and may be used or combined with other implementations that are shown and described. Further, the claims are not intended to be limited by any one example implementation. For example, one or more of the operations of the methods 500, 600 may be substituted for or combined with one or more operations of the methods 500, 600.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various illustrative logics, logical blocks, modules, components, circuits, and algorithm operations described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented as hardware or software depends upon the particular application and design constraints imposed on the overall system.

The hardware and data processing apparatus used to implement the various illustrative logics, logical blocks, modules, and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor also may be implemented as a combination, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or any combination thereof. Implementations of the subject matter described in this specification also can be implemented as one or more computer programs, i.e., one or more modules of computer program instructions, encoded on a non-transitory processor-readable storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module, which may reside on a computer-readable medium. Computer-readable media includes both computer storage media and communication media including any medium that can be enabled to transfer a computer program from one place to another. A storage media may be any available non-transitory storage media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes or instructions on a machine-readable medium and computer-readable medium, which may be incorporated into a computer program product.

In one or more aspects, the functions described may be implemented by a processor, which may be coupled to a memory. The memory may be a non-transitory computer-readable storage medium that stores processor-executable instructions. The memory may store an operating system, user application software, or other executable instructions. The memory also may store application data, such as an array data structure. The processor may read and write information to and from the memory. The memory also may store instructions associated with one or more protocol stacks. A protocol stack generally includes computer executable instructions to enable communication using a radio access protocol or communication protocol.

Various modifications to the implementations described in this disclosure may be readily apparent to those skilled in the art, and the generic principles defined herein may be applied to other implementations without departing from the scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example process in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method performed by a one or more processors of user equipment (UE) for providing UE mobility history information to a remote computing platform, comprising:
    transmitting UE mobility history information to the remote computing platform in response to a radio access network (RAN) connection state of the UE changing from a cell in a radio resource controller (RRC) state to another cell or to another RRC state, wherein the transmitted UE mobility history information includes time spent in at least one cell, identifier information of the at least one cell, and an indication of a multi-connectivity state of the at least one cell.

2. The method of claim 1, further comprising: including a global cell identity in a variable entry of the UE mobility history information in response to the global cell identity being one of a previous primary cell or a previous secondary cell that is available.

3. The method of claim 2, further comprising: including a physical cell identity and frequency in the variable entry of the UE mobility history information in response to the global cell identity of the previous primary cell or the previous secondary cell not being available.

4. The method of claim 1, further comprising: including a global cell identity of a previous primary cell or a previous secondary cell in a variable entry of the UE mobility history information in response to a dual/multi-connectivity status being required.

5. The method of claim 4, including an indication of a radio access technology (RAT) type in a variable entry of the UE mobility history information in response to a RAT type indication being required.

6. The method of claim 1, further comprising: including a physical cell identity and carrier frequency of a previous primary cell or secondary cell in a variable entry of the UE mobility history information in response to neither a global cell identity of the previous primary cell or secondary cell being available nor a dual/multi-connectivity status being required.

7. The method of claim 1, further comprising: including a global cell identity in a variable entry of the UE mobility history information in response to the UE entering a new radio or next generation RAN while previously out of service or using another RAT.

8. The method of claim 1, further comprising:
    receiving from the remote computing platform a UE information request; and
    transmitting a UE information response indicating the UE mobility history information is available to the remote computing platform.

9. The method of claim 1, wherein the UE mobility history information includes at least one data set selected from a listing of visited cells, an indication of how long the UE shall store the UE mobility history information, a cell list, a remote network access list, a timing advance list a radio access technology (RAT) type, and RRC state information.

10. The method of claim 1, wherein the UE changing from the cell in the RRC state to the another cell includes the UE changing to the another cell outside the RAN or to an inter-RAT cell.

11. The method of claim 1, wherein the UE changing from the cell in the RRC state to the another RRC state includes the UE changing to an out of service state.

12. The method of claim 1, further comprising: storing the UE mobility history information in memory within the UE.

13. A user equipment (UE) comprising:
one or more processors configured with processor-executable instructions to:
transmit UE mobility history information to a remote computing platform in response to a radio access network (RAN) connection state of the UE changing from a cell in a radio resource controller (RRC) state to another cell or to another RRC state, wherein the transmitted UE mobility history information includes time spent in at least one cell, identifier information of the at least one cell, and an indication of a multi-connectivity state of the at least one cell.

14. The UE of claim 13, wherein the one or more processors is are configured with processor-executable instructions to: include a global cell identity in a variable entry of the UE mobility history information in response to the global cell identity being one of a previous primary cell or a previous secondary cell that is available.

15. The UE of claim 14, wherein the one or more processors is are configured with processor-executable instructions to include a physical cell identity and frequency in the variable entry of the UE mobility history information in response to the global cell identity of the previous primary cell or the previous secondary cell not being available.

16. The UE of claim 13, wherein the one or more processors are configured with processor-executable instructions to include a global cell identity of a previous primary cell or a previous secondary cell in a variable entry of the UE mobility history information in response to a dual/multi-connectivity status being required.

17. The UE of claim 16, wherein the one or more processors is are configured with processor-executable instructions to include an indication of a radio access technology (RAT) type in a variable entry of the UE mobility history information in response to the RAT type indication being required.

18. The UE of claim 13, wherein the one or more processors are configured with processor-executable instructions to include a physical cell identity and carrier frequency of a previous primary cell or secondary cell in a variable entry of the UE mobility history information in response to neither a global cell identity of the previous primary cell or secondary cell being available nor a dual/multi connectivity status being required.

19. The UE of claim 13, wherein the one or more processors are configured with processor-executable instructions to include a global cell identity in a variable entry of the UE mobility history information in response to the UE entering a new radio or next generation RAN while previously out of service or using another RAT.

20. The UE of claim 13, wherein the one or more processors is are configured with processor-executable instructions to:
receive from the remote computing platform a UE information request; and
transmit a UE information response indicating the UE mobility history information is available to the remote computing platform.

21. The UE of claim 13, wherein the UE mobility history information includes at least one data set selected from a listing of visited cells, an indication of how long the UE shall store the UE mobility history information, a cell list, a remote network access list, a timing advance list a radio access technology (RAT) type and RRC state information.

22. The UE of claim 13, wherein the one or more processors is are configured with processor-executable instructions such that the UE changing from the cell in the RRC state to the another cell includes the UE changing to the another cell outside the RAN or to an inter-RAT cell.

23. The UE of claim 13, wherein the one or more processors is are configured with processor-executable instructions such that the UE changing from the cell in the RRC state to the another RRC state includes the UE changing to an out of service state.

24. The UE of claim 13, wherein the one or more processors is are configured with processor-executable instructions to: store the UE mobility history information in a memory of a computing platform.

25. A method performed by a one or more processors of a first remote radio access network (RAN) computing platform for providing user equipment (UE) mobility history information to a second remote RAN computing platform, comprising:
receiving UE mobility history information from a UE, wherein the UE mobility history information includes time spent in at least one cell, identifier information of the at least one cell, and an indication of a multi-connectivity state of the at least one cell; and
transmitting the UE mobility history information received from the UE to the second remote RAN computing platform.

26. The method of claim 25, wherein transmitting the UE mobility history information is part of at least one of a handover preparation procedure, a context retrieval procedure, a suspend procedure, and a UE context release complete procedure.

27. The method of claim 25, further comprising:
receiving UE mobility history information from a third remote RAN computing platform;
comparing the UE mobility history information received from the third RAN computing platform to the UE mobility history information received from the UE; and
storing the UE mobility history information received from the third RAN computing platform that does not conflict with the UE mobility history information received from the UE in a memory of the first remote RAN computing platform.

28. A computing platform for use in a first remote radio-access network (RAN), comprising:
one or more processors configured with processor-executable instructions to:
receive user equipment (UE) mobility history information from a UE, wherein the UE mobility history information includes time spent in at least one cell, identifier information of the at least one cell, and an indication of a multi-connectivity state of the at least one cell; and
transmit the UE mobility history information received from the UE to a second remote RAN computing platform.

29. The computing platform of claim 28, wherein to transmit the UE mobility history information, the one or more processors are configured with processor-executable instructions to transmit the UE mobility history information as part of at least one of a handover preparation procedure, a context retrieval procedure, a suspend procedure, and a UE context release complete procedure.

30. The computing platform of claim 28, wherein the one or more processors is configured with processor-executable instructions to:

receive UE mobility history information from a third remote RAN computing platform;
compare the UE mobility history information received from the third RAN computing platform to the UE mobility history information received from the UE; and
store the UE mobility history information received from the third RAN computing platform that does not conflict with the UE mobility history information received from the UE in a memory of the first remote RAN computing platform.

* * * * *